United States Patent
Takeda et al.

(10) Patent No.: US 7,295,424 B2
(45) Date of Patent: Nov. 13, 2007

(54) ELECTROLYTE FOR ELECTROLYTIC CAPACITOR, ELECTROLYTIC CAPACITOR AND PROCESS FOR PRODUCING TETRAFLUOROALUMINATE SALT OF ORGANIC ONIUM

(75) Inventors: Masayuki Takeda, Mie (JP); Hiroo Miyauchi, Mie (JP); Makoto Ue, Ibaraki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/733,936

(22) Filed: Apr. 11, 2007

(65) Prior Publication Data

US 2007/0188979 A1    Aug. 16, 2007

Related U.S. Application Data

(62) Division of application No. 10/533,234, filed as application No. PCT/JP03/14014 on Oct. 31, 2003, now Pat. No. 7,227,738.

(30) Foreign Application Priority Data

| Oct. 31, 2002 | (JP) | ................................. 2002-317860 |
| Nov. 6, 2002 | (JP) | ................................. 2002-322707 |
| Nov. 7, 2002 | (JP) | ................................. 2002-324179 |
| Nov. 8, 2002 | (JP) | ................................. 2002-325707 |
| Mar. 4, 2003 | (JP) | ................................. 2003-056995 |

(51) Int. Cl.
*H01G 9/04* (2006.01)
*H01G 9/145* (2006.01)

(52) U.S. Cl. ....................... 361/516; 361/503; 252/62.2

(58) Field of Classification Search ........ 361/502–505, 361/516; 252/62.2
See application file for complete search history.

(56) References Cited

U.S. PATENT DOCUMENTS

| 5,870,275 A | 2/1999 | Shiono et al. |
| 6,294,289 B1 | 9/2001 | Fanta et al. |
| 6,515,847 B1 * | 2/2003 | Naraya ...................... 361/523 |
| 7,072,173 B2 * | 7/2006 | Takeda et al. .............. 361/523 |

FOREIGN PATENT DOCUMENTS

| EP | 0 684 620 A1 | 11/1995 |
| JP | 10-32147 | 2/1998 |
| JP | 2003-137847 | 5/2003 |

* cited by examiner

*Primary Examiner*—Eric Thomas
(74) *Attorney, Agent, or Firm*—Oblon, Spivak, McClelland, Maier & Neustadt, P.C.

(57) ABSTRACT

There are provided an aluminum electrolytic capacitor comprising an anode, a cathode comprising aluminum and an electrolytic solution containing an onium salt of fluorine-containing anion, wherein the electrolytic solution has a water concentration of 1% by weight or less, or wherein the cathode has a peak top of Al2p spectrum of 74.0 to 75.8 eV as measured by a method in which the surface of the cathode in the aluminum electrolytic capacitor heated at 125° C. for 50 hours is analyzed by X-ray photoelectron spectroscopy (XPS); an electrolytic solution for electrolytic capacitor comprising a quaternary cyclic amidinium tetrafluoroaluminate and a solvent and containing specific impurity compounds in a total amount of 0.6% by weight or less, and an electrolytic capacitor using the electrolytic solution; and a method for preparing an organic onium tetrafluoroaluminate which is advantageously used in an aluminum electrolytic capacitor.

16 Claims, 2 Drawing Sheets

ELECTROLYTE FOR ELECTROLYTIC CAPACITOR, ELECTROLYTIC CAPACITOR AND PROCESS FOR PRODUCING TETRAFLUOROALUMINATE SALT OF ORGANIC ONIUM

This is a divisional application of U.S. application Ser. No. 10/533,234, filed Apr. 29, 2005 now U.S. Pat. 7,227,738, which is a 371 of PCT/JP03/14014 filed on Oct. 31, 2003.

FIELD OF THE INVENTION

The present invention relates to an electrolytic capacitor and an electrolytic solution for electrolytic capacitor, and more particularly to an aluminum electrolytic capacitor and an electrolytic solution for aluminum electrolytic capacitor.

Further, the present invention relates to a method for preparing an organic onium tetrafluoroaluminate. The organic onium tetrafluoroaluminate is a useful chemical substance used in a wide variety of fields, for example, as a surfactant; a phase transfer catalyst; a softener; an antistatic agent such as a detergent; a dispersant for asphalt or cement; a germicide; a preservative; an anti-blocking agent for fertilizer or granulated product; or an anticoagulant, and especially useful as an electrolyte for an electrochemical device such as a battery or an electrolytic capacitor.

BACKGROUND ART

An aluminum electrolytic capacitor has an advantageous feature such that it has a reduced size and a large electrostatic capacity, and is widely used in low frequency filter and by-pass. The aluminum electrolytic capacitor generally has a structure such that an anode foil and a cathode foil are spirally wound via a separator which prevents the occurrence of short-circuiting between the anode and the cathode, and placed and be sealed up in a casing (see FIG. 1 and FIG. 2). As the anode foil, aluminum having an insulating oxide film formed thereon as a dielectric layer is used, and as the cathode foil, an aluminum foil treated by etching is generally used. The separator disposed between the anode and the cathode is impregnated with an electrolytic solution which functions as an actual cathode.

Among the properties of the electrolytic solution, electric conductivity directly affects the electrolytic capacitor in respect of energy loss and impedance characteristics, and therefore an electrolytic solution having high electric conductivity is being vigorously developed. For example, electrolytic solutions comprising a quaternary ammonium salt (e.g., Japanese Prov. Patent Publication Nos. 145715/1987 and 145713/1987) or a quaternary amidinium salt (e.g., WO95/15572 pamphlet and Japanese Prov. Patent Publication No. 283379/1997) of phthalic acid or maleic acid dissolved in an aprotic solvent such as γ-butyrolactone, have been proposed. However, these electrolytic solutions do not have satisfactory ionic mobility, and further they unsatisfactorily achieve anodization of the anode aluminum, and hence they can be generally used only in capacitors having a rated voltage of 35 V or less.

For removing the disadvantages, an electrolytic solution for electrolytic capacitor having high electric conductivity and excellent heat stability as well as higher withstand voltage, and an electrolytic capacitor having lower impedance and excellent heat stability as well as higher withstand voltage are desired.

The present inventors have previously found that an electrolytic solution for electrolytic capacitor containing tetrafluoroaluminate ions satisfies the requirements (Japanese Patent Application No. 2002-135387). However, the electrolytic capacitor using this electrolytic solution has a problem in that it hardly maintains the initial properties including high electric conductivity, excellent heat stability and high withstand voltage for a long term. In addition, the electrolytic capacitor using the electrolytic solution has a problem in that a current which frequently flows after a direct voltage is applied to the electrolytic capacitor for a certain time, i.e., a leakage current is large.

In this connection, the present inventors have made studies on the moisture in the electrolytic solution. The moisture in the electrolytic solution is not considered to cause a problem in a conventional aluminum electrolytic capacitor using an electrolytic solution comprising an electrolyte such as a quaternary ammonium salt or a quaternary amidinium salt of phthalic acid or maleic acid dissolved in a polar aprotic solvent such as γ-butyrolactone, and for example, when the electrolytic solution has a moisture content of about 3% by weight, there is no problem in the practical use.

However, from the studies made by the present inventors, it has been found that, in the aluminum electrolytic capacitor using an onium salt of fluorine-containing anion as an electrolyte, the moisture in the electrolytic solution considerably affects the performance of the capacitor. The reason for this is presumed that the moisture in the electrolytic solution remarkably affects the state of surface of the aluminum electrode. They have found that, by restricting the moisture content of the electrolytic solution, there can be provided an electrolytic capacitor which solves the above problems, particularly which is improved in the leakage current properties and life properties of the capacitor and can be used stably for a long term, and thus the present invention has been completed.

Further, with respect to the two types of aluminum electrolytic capacitors each using an electrolytic solution containing tetrafluoroaluminate wherein one markedly deteriorates in performance and another does not deteriorate in performance during the use of them for a long term, the present inventors have made close studies on the surface of the respective electrodes. As a result, they have found that, in the electrolytic capacitor which markedly deteriorates in performance, aluminum in the cathode is fluorinated.

In the conventional aluminum electrolytic capacitor using an electrolytic solution comprising an electrolyte such as a quaternary ammonium salt or a quaternary amidinium salt of phthalic acid or maleic acid dissolved in a polar aprotic solvent such as γ-butyrolactone, the cathode surface is not fluorinated, and therefore the fluorination of the cathode surface is found to be a cause of the deterioration of performance. It has been found that an aluminum electrolytic capacitor using a cathode having an Al2p spectrum in the range of 74.0 to 75.8 eV as measured by a method in which the surface of the cathode subjected to a specific accelerated test is analyzed by X-ray photoelectron spectroscopy, is unlikely to suffer fluorination of the cathode and solves the above problems, particularly is improved in the life properties so that it can be used stably for a long term, and thus the present invention has been completed.

In addition, from the studies made by the present inventors, it has been found that, with respect to the electrolytic capacitor using an electrolytic solution which comprises a tetrafluoroaluminate and a solvent, when the total amount of specific compounds contained as impurities in the electrolytic solution is a certain concentration or more, the leakage current of the electrolytic capacitor increases. The reason for this is presumed that these compounds are poor in electrochemical stability and hence a current flows due to the electrochemical reaction of the compounds. Thus, it has been found that, by using an electrolytic solution having a predetermined concentration or less of these compounds, an electrolytic capacitor having improved leakage current properties can be provided, and thus the present invention has been completed.

On the other hand, as methods for preparing an organic onium tetrafluoroaluminate which is useful as an electrolyte for electrochemical device as mentioned above, there are known a method in which an organoaluminum compound and a pyridine-hydrogen fluoride complex are reacted with each other (see, for example, Journal of the American Chemical Society, 1993, vol. 115, p. 3,028); a method in which an organic onium tetrafluoroaluminate and an amine compound are reacted with each other (see, for example, Journal of the American Chemical Society, 1993, vol. 115, p. 3,028); a method in which an organic onium carbonate or hydrogencarbonate and an ammonium tetrafluoroaluminate are reacted with each other (see, for example, Japanese Prov. Patent Publication No. 322760/1999); a method in which an organic onium hydroxide and an ammonium tetrafluoroaluminate are reacted with each other (see, for example, Japanese Prov. Patent Publication No. 322759/1999); and a method in which tetramethylammonium fluoride, aluminum fluoride, hydrogen fluoride and water are reacted with one another (see, for example, Monatshefte fur Chemie, 1975, vol. 106, p. 483).

Further, as methods for synthesizing an organic onium polyfluorometalate, there are known a method in which polyfluorometalate hydroacid and an organic onium halide (see, for example, Journal of Organic Chemistry, 1971, vol. 36, p. 2,371), an organic onium hydroxide (see, for example, Journal of the Chemical Society, Perkin Transactions 2, 1978, vol. 3, p. 254) or an organic onium alkylcarbonate (see, for example, Examined Japanese Patent Application Publication No. 116113/1995) are reacted with each other and a method in which hydrogenfluoride of a quaternary ammonium fluoride is synthesized from a quaternary ammonium salt and a hydrogen fluoride, and then reacted with boron trifluoride (see, for example, Japanese Prov. Patent Publication No. 310555/1999).

However, the method using an organoaluminum has problems in that a spontaneously ignitable substance must be handled, and that the reaction proceeds through pyridinium tetrafluoroaluminate to increase the steps in the method. In the method in which ammonium tetrafluoroaluminate is reacted, the ammonium tetrafluoroaluminate has low solubility, and hence is actually unsuitable for the reaction. Further, the presence of hydroacid of tetrafluoroaluminate (tetrafluoroaluminic acid) is suggested, but complete elucidation has not yet been made, and there is a problem in that it is rarely commercially available.

On the other hand, boron and aluminum belong to the same group of elements. However, unlike the reaction of hydrogenfluoride of an organic onium fluoride and boron trifluoride, the reaction of hydrogenfluoride of an organic onium fluoride and aluminum trifluoride in the presence of excess hydrogen fluoride forms a hexafluoroaluminate having a coordination number of 6 in addition to the tetrafluoroaluminate, and therefore aluminum cannot be applied to this reaction.

Therefore, the development of the method for preparing an organic onium tetrafluoroaluminate which is suitable for the commercial production has been strongly desired.

For solving the above problems, the present inventors have previously invented a method for preparing an organic onium tetrafluoroaluminate which comprises reacting a hydrogen fluoride, an organic onium and aluminum trifluoride (Japanese Patent Application No. 2002-129141).

They have conducted studies with a view toward the developing an improved method for preparing an organic onium tetrafluoroaluminate which has further advantageous commercially. As a result, it has been found that the aluminum trifluoride used in the method can be replaced by hydrogen fluoride or fluorosilicic acid as a source of fluorine and an aluminum compound (excluding aluminum trifluoride) or metallic aluminum as a source of aluminum so that an organic onium salt can be prepared more inexpensively, and thus the present invention has been completed.

DISCLOSURE OF THE INVENTION

A gist of the present invention resides in an aluminum electrolytic capacitor which comprises an anode, a cathode comprising aluminum and an electrolytic solution containing an onium salt of fluorine-containing anion, wherein the electrolytic solution has a water concentration of 1% by weight or less.

Further, a gist of the present invention resides in an aluminum electrolytic capacitor which comprises an anode, a cathode comprising aluminum and an electrolytic solution containing an onium salt of fluorine-containing anion, wherein the cathode has a peak top of Al2p spectrum of 74.0 to 75.8 eV as measured by a method in which the surface of the cathode in the aluminum electrolytic capacitor heated at 125° C. for 50 hours is analyzed by X-ray photoelectron spectroscopy (XPS).

In addition, a gist of the present invention resides in an electrolytic solution for electrolytic capacitor which comprises a quaternary cyclic amidinium tetrafluoroaluminate represented by the following formula (1) and a solvent, the electrolytic solution containing compounds represented by the following formulae (2) to (4) in a total amount of 0.6% by weight or less, and the electrolytic capacitor using the electrolytic solution:

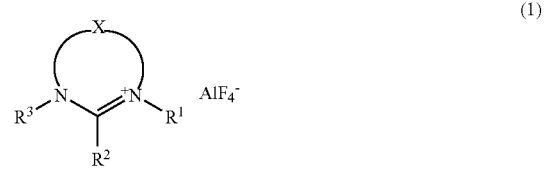

(1)

wherein:

each of $R^1$ to $R^3$ independently represents an alkyl group which may be substituted, a cycloalkyl group which may be substituted, an aryl group which may be substituted or an aralkyl group which may be substituted;

X represents an alkylene group which may be substituted or an arylene group which may be substituted; or any of two selected from $R^1$ to $R^3$ and X may be connected together to form a ring, wherein the ring may have a nitrogen atom(s) in addition to the nitrogen atoms in the formula (1),

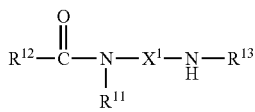
(2)

wherein:
each of $R^{11}$ to $R^{13}$ independently represents a hydrogen atom, an alkyl group which may be substituted, a cycloalkyl group which may be substituted, an aryl group which may be substituted or an aralkyl group which may be substituted;

$X^1$ represents an alkylene group which may be substituted or an arylene group which may be substituted; or any of two selected from $R^{11}$ to $R^{13}$ and $X^1$ may be connected together to form a ring, wherein the ring may have a nitrogen atom(s) in addition to the nitrogen atoms in the formula (2), wherein the amino group may be protonated to form a salt,

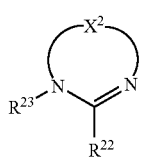
(3)

wherein:
each of $R^{22}$ and $R^{23}$ independently represents a hydrogen atom, an alkyl group which may be substituted, a cycloalkyl group which may be substituted, an aryl group which may be substituted or an aralkyl group which may be substituted;

$X^2$ represents an alkylene group which may be substituted or an arylene group which may be substituted; or any of two selected from $R^{22}$, $R^{23}$ and $X^2$ may be connected together to form a ring, wherein the ring may have a nitrogen atom(s) in addition to the nitrogen atoms in the formula (3), wherein the amidine group may be protonated to form a salt,

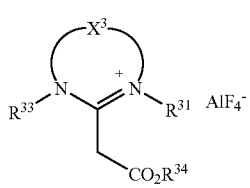
(4)

wherein:
each of $R^{31}$, $R^{33}$ and $R^{34}$ independently represents an alkyl group which may be substituted, a cycloalkyl group which may be substituted, an aryl group which may be substituted or an aralkyl group which may be substituted;

$X^3$ represents an alkylene group which may be substituted or an arylene group which may be substituted; or any of two selected from $R^{31}$, $R^{33}$ and $X^3$ may be connected together to form a ring, wherein the ring may have a nitrogen atom(s) in addition to the nitrogen atoms in the formula (4).

Furthermore, a gist of the present invention resides in a method for preparing an organic onium tetrafluoroaluminate which comprises reacting (i) hydrogen fluoride and/or fluorosilicic acid; (ii) an organic onium salt; and (iii) an aluminum compound with the proviso that aluminum trifluoride is excluded, and/or metallic aluminum, as well as the electrolytic solution for electrolytic capacitor and the electrolytic capacitor using the method.

BEST MODE FOR CARRYING OUT THE INVENTION

Figure 1:
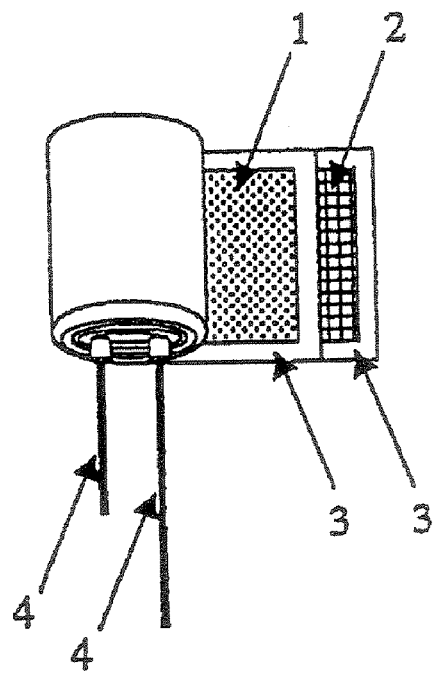
FIG. 1 is a diagrammatic view of an electrolytic capacitor in a spirally-wound form, wherein reference numeral 1 designates an anode foil, reference numeral 2 designates a cathode foil, reference numeral 3 designates a separator, and reference numeral 4 designates a lead wire.

Hereinbelow, the present invention will be described in detail. The present specification includes the contents of Japanese Patent Application Nos. 2002-317860, 2002-322707, 2002-324179, 2002-325707 and 2003-056995.

In the first embodiment, the present invention is directed to an aluminum electrolytic capacitor comprising an anode, a cathode comprising aluminum and an electrolytic solution containing an onium salt of fluorine-containing anion, wherein the electrolytic solution has a water concentration of 1% by weight or less.

[Basic Construction of Aluminum Electrolytic Capacitor]

The basic construction of the aluminum electrolytic capacitor is similar to that of a conventionally known aluminum electrolytic capacitor, and an anode and a cathode via a separator impregnated with an electrolytic solution are contained in a casing.

[Anode]

As an anode, like in a conventional aluminum electrolytic capacitor, one having an aluminum oxide film layer formed on the surface of aluminum is used. As the aluminum, generally, aluminum having a purity of 99.9% or more is used. The aluminum oxide film layer can be formed by, for example, a method in which aluminum is subjected to surface treatment by chemical or electrochemical etching in an acidic solution, and then anodized in an aqueous solution of ammonium adipate, boric acid or phosphoric acid. The anode generally has a thickness of 50 to 500 μm.

[Cathode]

As a cathode, aluminum or an aluminum alloy is used. As the aluminum, one having a purity of 99.9% or more is used, and as the aluminum alloy, one having an aluminum content of about 99% is used. The surface of aluminum may be subjected to surface treatment by etching. Especially preferred is aluminum having a purity of 99.9% which is excellent in hydration resistance. The cathode generally has a thickness of 20 to 200 μm.

[Separator]

Examples of separators include paper such as manila paper and kraft paper, and non-woven fabric of glass fiber, polypropylene, polyethylene or polyphenylene sulfide. Of these, preferred is paper, especially manila paper.

[Electrolytic Solution]

The electrolytic solution is comprised mainly of an onium salt of fluorine-containing anion and a solvent which dissolves the salt.

Examples of fluorine-containing anions include anions represented by the following formula (a):

$$MF_n^-  \quad (a)$$

wherein:
M represents an element selected from the group consisting of B, Al, P, Nb, Sb and Ta; and
n represents a number of 4 or 6 determined by the valence of M, perfluoroalkanesulfonic acid anions, bis(perfluoroalkanesulfonyl)imide anions, tris(perfluoroalkanesulfonyl)methide anions, perfluoroalkylfluoroboric acid anions and perfluoroalkylfluorophosphoric acid anions. Of these, preferred are anions represented by the formula (a) above.

Specific examples of anions represented by the formula (a) include a tetrafluoroboric acid ion, a tetrafluoroaluminate ion, a hexafluorophosphoric acid ion, a hexafluoroniobic acid ion, a hexafluoroantimonic acid ion and a hexafluorotantalic acid ion. Of these, preferred is a tetrafluoroaluminate ion ($AlF_4^-$) since an electrolytic solution having high electric conductivity and excellent heat stability as well as high withstand voltage can be obtained.

Either one type or two or more types of fluorine-containing anions may be used. When a tetrafluoroaluminate ion and another fluorine-containing anion are used in combination as the anion, the content of tetrafluoroaluminate ions in the fluorine-containing anions is preferably 5 to 100 mol %, more preferably 30 to 100 mol %, especially preferably 50 to 100 mol %. It is most preferred that tetrafluoroaluminate ions are solely used as the fluorine-containing anion.

Examples of onium salts include quaternary onium salts and ammonium salts, and examples of quaternary onium salts include quaternary ammonium salts, quaternary phosphonium salts, quaternary imidazolium salts and quaternary amidinium salts, and these salts may be used individually or in combination. There can be mentioned the following specific examples.

A. Quaternary Ammonium Ion in Quaternary Ammonium Salt

1) Tetraalkylammonium

Examples include tetramethylammonium, ethyltrimethylammonium, diethyldimethylammonium, triethylmethylammonium, tetraethylammonium, trimethyl-n-propylammonium, trimethylisopropylammonium, trimethyl-n-butylammonium, trimethylisobutylammonium, trimethyl-t-butylammonium, trimethyl-n-hexylammonium, dimethyldi-n-propylammonium, dimethyldiisopropylammonium, dimethyl-n-propylisopropylammonium, methyltri-n-propylammonium, methyltriisopropylammonium, methyldi-n-propylisopropylammonium, methyl-n-propyldiisopropylammonium, triethyl-n-propylammonium, triethylisopropylammonium, triethyl-n-butylammonium, triethylisobutylammonium, triethyl-t-butylammonium, dimethyldi-n-butylammonium, dimethyldiisobutylammonium, dimethyldi-t-butylammonium, dimethyl-n-butylethylammonium, dimethylisobutylethylammonium, dimethyl-t-butylethylammonium, dimethyl-n-butylisobutylammonium, dimethyl-n-butyl-t-butylammonium, dimethylisobutyl-t-butylammonium, diethyldi-n-propylammonium, diethyldiisopropylammonium, diethyl-n-propylisopropylammonium, ethyltri-n-propylammonium, ethyltriisopropylammonium, ethyldi-n-propylisopropylammonium, ethyl-n-propyldiisopropylammonium, diethylmethyl-n-propylammonium, ethyldimethyl-n-propylammonium, ethylmethyldi-n-propylammonium, diethylmethylisopropylammonium, ethyldimethylisopropylammonium, ethylmethyldiisopropylammonium, ethylmethyl-n-propylisopropylammonium, tetra-n-propylammonium, tetraisopropylammonium, n-propyltriisopropylammonium, di-n-propyldiisopropylammonium, tri-n-propylisopropylammonium, trimethylpentylammonium, trimethylheptylammonium, trimethyloctylammonium, trimethylnonylammonium, trimethyldecylammonium, trimethylundecylammonium and trimethyldodecylammonium.

2) Aromatic Substituted Ammonium

Examples include trimethylphenylammonium and tetraphenylammonium.

3) Aliphatic Cyclic Ammonium

Examples include pyrrolidinium such as N,N-dimethylpyrrolidinium, N-ethyl-N-methylpyrrolidinium, N,N-diethylpyrrolidinium and N,N-tetramethylenepyrrolidinium; piperidinium such as N,N-dimethylpiperidinium, N-ethyl-N-methylpiperidinium, N,N-diethylpiperidinium, N,N-tetramethylenepiperidinium and N,N-pentamethylenepiperidinium; and morpholinium such as N,N-dimethylmorpholinium, N-ethyl-N-methylmorpholinium and N,N-diethylmorpholinium.

4) Nitrogen-Containing Heterocyclic Aromatic Compound Ion

Examples include pyridinium such as N-methylpyridinium, N-ethylpyridinium, N-n-propylpyridinium, N-isopropylpyridinium and N-n-butylpyridinium.

B. Quaternary Phosphonium Ion in Quaternary Phosphonium Salt

Examples include tetramethylphosphonium, triethylmethylphosphonium and tetraethylphosphonium.

C. Quaternary Imidazolium Ion in Quaternary Imidazolium Salt

Examples include 1,3-dimethylimidazolium, 1,2,3-trimethylimidazolium, 1-ethyl-3-methylimidazolium, 1-ethyl-2,3-dimethylimidazolium, 1,3-diethylimidazolium, 1,2-diethyl-3-methylimidazolium, 1,3-diethyl-2-methylimidazolium, 1,2-dimethyl-3-n-propylimidazolium, 1-n-butyl-3-methylimidazolium, 1,2,4-trimethyl-3-n-propylimidazolium, 1,2,3,4-tetramethylimidazolium, 1,2,3,4,5-pentamethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethyl-2-n-undecylimidazolium and 1,3-dimethyl-2-n-heptadecylimidazolium. Further examples include imidazolium having a hydroxyl group or an ether group such as 2-(2'-hydroxy)ethyl-1,3-dimethylimidazolium, 1-(2'-hydroxy)ethyl-2,3-dimethylimidazolium, 2-ethoxymethyl-1,3-dimethylimidazolium and 1-ethoxymethyl-2,3-dimethylimidazolium.

D. Quaternary Amidinium Ion in Quaternary Amidinium Salt

1) Quaternary Imidazolinium

Examples include 1,3-dimethylimidazolinium, 1,2,3-trimethylimidazolinium, 1-ethyl-3-methylimidazolinium, 1-ethyl-2,3-dimethylimidazolinium, 1,3-diethylimidazolinium, 1,2-diethyl-3-methylimidazolinium, 1,3-diethyl-2-methylimidazolinium, 1,2-dimethyl-3-n-propylimidazolinium, 1-n-butyl-3-methylimidazolinium, 1,2,4-trimethyl-3-n-propylimidazolinium, 1,2,3,4-tetramethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium, 2-benzyl-1,3-dimethylimidazolinium, 1,3-dimethyl-2-n-undecylimidazolinium and 1,3-dimethyl-2-n-heptadecylimidazolinium.

2) Quaternary Tetrahydropyrimidinium

Examples include 1,3-dimethyltetrahydropyrimidinium, 1,3-diethyltetrahydropyrimidinium, 1-ethyl-3-methyltetrahydropyrimidinium, 1,2,3-trimethyltetrahydropyrimidinium, 1,2,3-triethyltetrahydropyrimidinium, 1-ethyl-2,3-dimethyltetrahydropyrimidinium, 2-ethyl-1,3-dimethyltetrahydropyrimidinium, 1,2-diethyl-3-methyltetrahydropyrimidinium, 1,3-diethyl-2-methyltetrahydropyrimidinium, 5-methyl-1,5-diazabicyclo[4.3.0]nonenium-5 and 8-methyl-1,8-diazabicyclo[5.4.0]undecenium-7.

(3) Quaternary Amidinium Having a Hydroxyl Group or an Ether Group

Examples include 2-(2'-hydroxy)ethyl-1,3-dimethylimidazolinium, 1-(2'-hydroxy)ethyl-2,3-dimethylimidazolinium, 2-ethoxymethyl-1,3-dimethylimidazolinium, 1-ethoxymethyl-2,3-dimethylimidazolinium and 1,2,3-trimethyl-1,4-dihydropyrimidinium.

E. Amine in Ammonium Salt

Examples of amines in the ammonium salt include tertiary amines such as trimethylamine, ethyldimethylamine, diethylmethylamine, triethylamine, pyridine, picoline, pyrimidine, pyridazine, N-methylimidazole, 1,5-diazabicyclo[4.3.0]nonene-5 and 1,8-diazabicyclo[5.4.0]undecene-7; secondary amines such as diethylamine, diisopropylamine, isobutylamine, di-2-ethylhexylamine, pyrrolidine, piperidine, morpholine and hexamethyleneimine; primary amines such as ethylamine, n-propylamine, isopropylamine, t-butylamine, sec-butylamine and 2-ethylhexylamine; amines having an ether group such as 3-methoxypropylamine and 3-ethoxypropylamine; and ammonia. In ammonia, an ammonium ion is in the form of $NH_4^+$.

Of these, from the viewpoint of obtaining an electrolytic solution having high electric conductivity and preventing corrosion of aluminum in the cathode, preferred is a quaternary onium, more preferred is a quaternary amidinium, and most preferred is a quaternary imidazolinium. Among the quaternary imidazolinium, preferred are 1-ethyl-2,3-dimethylimidazolinium and 1,2,3,4-tetramethylimidazolinium.

From the viewpoint of obtaining an electrolytic solution having high electric conductivity, it is preferred that the quaternary onium ion has 4 to 12 carbon atoms in total.

The lower the concentration of the onium salt of fluorine-containing anion in the electrolytic solution is, the withstand voltage of the electrolytic solution for electrolytic capacitor tends to become higher, and therefore, the onium salt concentration may be determined depending on a desired rated voltage of a capacitor, and the electrolytic solution may be in the form of either a concentrated solution having a concentration as high as 50% by weight or a normal temperature molten salt, but the onium salt concentration is generally 5% by weight or more, preferably 10% by weight or more, and is generally 40% by weight or less, preferably 35% by weight or less. When the concentration of the onium salt of fluorine-containing anion in the electrolytic solution is too low, the electric conductivity of the electrolytic solution is low. When the concentration is too high, the viscosity of the electrolytic solution is increased or precipitation is likely to occur in the electrolytic solution at a low temperature.

The electrolytic solution may further contain an anion component other than the fluorine-containing anion. Specific examples of such anions include carboxylic acid ions such as a hydrogenphthalic acid ion, a phthalic acid ion, a hydrogenmaleic acid ion, a maleic acid ion, a salicylic acid ion, a benzoic acid ion, a hydrogenadipic acid ion and an adipic acid ion; sulfonic acid ions such as a benzenesulfonic acid ion, a toluenesulfonic acid ion and a dodecylbenzenesulfonic acid ion; and inorganic oxo-acid ions such as a boric acid ion and a phosphoric acid ion.

Of these, preferred are hydrogenphthalic acid ions since an electrolytic solution having high electric conductivity can be obtained and the heat stability is excellent. When hydrogenphthalate and the onium salt of fluorine-containing anion are used in combination, it is preferred that the onium salt of fluorine-containing anion mainly constitutes the salts, and the amount of the onium salt of fluorine-containing anion is preferably 50% by weight or more, more preferably 60% by weight or more, further preferably 70% by weight or more based on the total weight of the salts, and the content of the onium salt of fluorine-containing anion in the salts is preferably higher.

When the electrolytic solution contains a salt other than the onium salt of fluorine-containing anion, the concentration of the salt other than the onium salt of fluorine-containing anion in the electrolytic solution is generally 0.1% by weight or more, preferably 1% by weight or more, and is generally 20% by weight or less, preferably 10% by weight or less.

Examples of solvents for the electrolytic solution include carbonic esters, carboxylic esters, phosphoric esters, nitriles, amides, sulfones, alcohols, ethers, sulfoxides, ureas and urethanes.

Examples of carbonic esters include chain carbonic esters such as dimethyl carbonate, ethylmethyl carbonate, diethyl carbonate, diphenyl carbonate and methylphenyl carbonate; and cyclic carbonic esters such as ethylene carbonate, propylene carbonate, ethylene 2,3-dimethylcarbonate, butylene carbonate, vinylene carbonate and ethylene 2-vinylcarbonate.

Examples of carboxylic esters include aliphatic carboxylic esters such as methyl formate, methyl acetate, methyl propionate, ethyl acetate, propyl acetate, butyl acetate and amyl acetate; aromatic carboxylic esters such as methyl benzoate and ethyl benzoate; and lactones such as γ-butyrolactone, γ-valerolactone and δ-valerolactone. Of these, preferred is γ-butyrolactone.

Examples of phosphoric esters include trimethyl phosphate, ethyldimethyl phosphate, diethylmethyl phosphate and triethyl phosphate.

Examples of nitriles include acetonitrile, propionitrile, methoxyacetonitrile, methoxypropionitrile, glutaronitrile, adiponitrile and 2-methylglutaronitrile.

Examples of amides include N-methylformamide, N-ethylformamide, N,N-dimethylformamide, N,N-dimethylacetamide and N-methylpyrrolidinone.

Examples of sulfones include dimethyl sulfone, ethylmethyl sulfone, diethyl sulfone, sulfolane, 3-methylsulfolane and 2,4-dimethylsulfolane. Of these, preferred are sulfolane and 3-methylsulfolane.

Examples of alcohols include ethylene glycol, propylene glycol, ethylene glycol monomethyl ether and ethylene glycol monoethyl ether.

Examples of ethers include ethylene glycol dimethyl ether, ethylene glycol diethyl ether, 1,4-dioxane, 1,3-dioxolane, tetrahydrofuran, 2-methyltetrahydrofuran, 2,6-dimethyltetrahydrofuran and tetrahydropyran.

Examples of sulfoxides include dimethyl sulfoxide, methylethyl sulfoxide and diethyl sulfoxide.

Examples of ureas include 1,3-dimethyl-2-imidazolidinone and 1,3-dimethyl-3,4,5,6-tetrahydro-2(1H)-pyrimidinone.

Examples of urethanes include 3-methyl-2-oxazolidinone.

These solvents may be used individually or in combination.

Preferred is γ-butyrolactone since an electrolytic solution having high electric conductivity can be obtained, excellent properties are exhibited in a wide range of temperatures, and the electrode materials are unlikely to suffer corrosion. From the viewpoint of achieving excellent heat stability, preferred are sulfolane and 3-methylsulfolane. Sulfolane or 3-methylsulfolane and γ-butyrolactone may be used in combination.

By using the above solvent, there can be obtained an electrolytic capacitor having low impedance and high withstand voltage which ensures that it can operate at a working environment temperature of 110 to 150° C. for 1,000 hours or longer.

[Production of Aluminum Electrolytic Capacitor]

An aluminum electrolytic capacitor is generally produced by spirally winding or laminating an anode in a foil form and a cathode in a foil form via a separator impregnated with an electrolytic solution to form an element; placing the element in an outer casing; inserting a sealing material to the opening end portion of the outer casing; and then sealing the end portion of the outer casing by drawing-processing.

As the outer casing, a casing made of aluminum or a resin can be used, and preferred is a casing made of aluminum since it is easy to seal and inexpensive.

As the sealing material, a rubber such as a butyl rubber or a Teflon® rubber can be used. As a butyl rubber, a rubber elastomer can be used, which is obtained by adding reinforcement such as carbon black, bulk filler such as clay, talc or calcium carbonate, a processing aid such as stearic acid or zinc oxide and a vulcanizing agent to raw rubber comprised of a copolymer of isobutylene and isoprene, and kneading the resultant mixture, and then rolling and molding it. As a vulcanizing agent, an alkylphenolic formalin resin; a peroxide such as dicumyl peroxide, 1,1-di-(t-butylperoxy)-3,3,5-trimethylcyclohexane or 2,5-dimethyl-2,5-di-(t-butylperoxy)hexane; a quinoid such as p-quinone dioxime or p,p'-dibenzoylquinone dioxime; or sulfur can be used.

In the aluminum electrolytic capacitor using a rubber as the sealing material, the rubber is permeable to gas to some extent, and therefore, the solvent volatilizes inside the capacitor and goes into air in an environment at a high temperature, or moisture is mixed from air into the inside of the capacitor in an environment at a high humidity at a high temperature. In such a severe environment, the capacitor may suffer an unfavorable change in properties such as the lowering of the electrostatic capacity, and therefore, for reducing the permeability to the solvent vapor, it is preferred that the surface of the rubber sealing material is coated with a resin such as Teflon®, or is covered with a plate such as a plate made of Bakelite. The sealing material contains moisture depending on the material therefor, and hence it is preferred that the sealing material is stored in a dry state, or a material which generates no water is used in the sealing material.

The aluminum electrolytic capacitor of the present invention may have a hermetic seal structure or a structure such that a resin casing containing the capacitor is sealed (for example, described in Japanese Prov. Patent Publication No. 148384/1996). The capacitor having a hermetic seal structure or a structure such that a resin casing containing the capacitor is sealed has very low gas permeability, and hence exhibits stable properties even in the above severe environment.

With respect to the form of the aluminum electrolytic capacitor of the present invention, there is no particular limitation, and any form such as a cylindrical form, an ellipsoid form, a rectangular parallelopiped form or a chip form can be employed.

[Water Concentration of Electrolytic Solution in Aluminum Electrolytic Capacitor]

The aluminum electrolytic capacitor of the present invention has a characteristic feature such that the water concentration of the electrolytic solution in the capacitor is 1% by weight or less. The water concentration of the electrolytic solution in the capacitor is preferably 0.8% by weight or less, further preferably 0.7% by weight or less. The water concentration is preferably as low as possible, but practically a water concentration of less than 10 ppm is difficult to achieve and such a low concentration has no advantage.

Thus, preferred production of the aluminum electrolytic capacitor of the present invention is as follows.

It is preferred that a dried anode and a dried cathode are used. Generally, an anode and a cathode each having a moisture content on the surface of 100 ppm or less, preferably 10 ppm or less are used.

A moisture content of the separator varies depending on the material therefor, and the separator absorbs moisture in air and hence generally has a moisture content of about 2% by weight, and it has a moisture content of about 8% by weight in air with high humidity. Therefore, it is preferred that the separator is dried to remove the water absorbed and then used in the production of the capacitor. Generally, the separator is dried so that the moisture content becomes 1,000 ppm or less, preferably 500 ppm or less, more preferably 100 ppm or less.

The electrolytic solution used in the electrolytic capacitor assembling generally has a moisture content of 5,000 ppm or less, preferably a moisture content of 1,000 ppm or less, especially preferably 100 ppm or less.

As the electrolyte used in the preparation of the electrolytic solution, one having generally a moisture content of 1,000 ppm or less, preferably 500 ppm or less, more preferably 100 ppm or less is used. The materials for synthesizing the electrolyte or solvents such as methanol and acetonitrile used in the process for synthesis frequently contain water. Therefore, for reducing the moisture content of the electrolyte, the moisture content of the solvent used in the synthesis of the electrolyte is reduced, or materials for synthesis from which water is removed using a dehydrating agent such as molecular sieves or alumina, or a treatment such as azeotropic distillation are used. Moisture in air may be mixed into or adhere to the electrolyte having a reduced moisture content according to the conditions of storage of the electrolyte and may be incorporated into the capacitor, and therefore, it is preferred that the electrolyte is stored in a dry state or preliminarily dried and then used in the preparation of the electrolytic solution.

As the solvent used in the preparation of the electrolytic solution, one having generally a moisture content of 5,000 ppm or less, preferably 1,000 ppm or less, more preferably 100 ppm or less is used. The moisture content of the solvent considerably affects the moisture content of the resultant electrolytic solution.

For preventing moisture from mixing into the capacitor, the moisture content of the atmosphere for the capacitor assembling is preferably 50% or less, especially preferably 10% or less, in terms of a relative humidity. The moisture content of the atmosphere is advantageously as low as possible.

Generally, an electrolytic solution comprising an onium salt of fluorine-containing anion as an electrolyte has an electric conductivity of 5 to 30 mS/cm at 25° C. and a withstand voltage of 100 to 250 V at 125° C., and has a feature such that the electrolytic solution has both high electric conductivity and high withstand voltage as compared to a conventional non-fluorine-containing anion electrolytic solution. Particularly, the electrolytic solution comprising a quaternary amidinium salt of tetrafluoroaluminate as an electrolyte and γ-butyrolactone as a solvent has extremely excellent properties such that it has an electric conductivity of 20 mS/cm or more and a withstand voltage of 150 V or more, and an aluminum electrolytic capacitor using this electrolytic solution has low impedance and high withstand voltage as well as excellent heat stability. However, this electrolytic solution is easily adversely affected by water, and when the moisture content of the electrolytic solution in the capacitor is too large, the leakage current of the capacitor is increased, causing problems in that the life properties including the equivalent series resistance (ESR) deteriorate or blistering of the capacitor due to generation of gas occurs. On the other hand, in the aluminum electrolytic capacitor of the present invention, by lowering the water concentration of the electrolytic solution, the above problems are solved.

In the second embodiment, the present invention is directed to an aluminum electrolytic capacitor comprising an anode, a cathode comprising aluminum and an electrolytic solution containing an onium salt of fluorine-containing anion, wherein the cathode has a peak top of Al2p spectrum of 74.0 to 75.8 eV as measured by a method in which the surface of the cathode in the aluminum electrolytic capacitor heated at 125° C. for 50 hours is analyzed by X-ray photoelectron spectroscopy (XPS).

The basic construction of the aluminum electrolytic capacitor, anode, cathode, separator and electrolytic solution as well as the production of the aluminum electrolytic capacitor are as mentioned in the first embodiment.

Preferred production of the aluminum electrolytic capacitor of the present invention is as follows.

As the cathode, from the viewpoint of preventing fluorination of the cathode surface, especially preferred is aluminum having a purity of 99.9% which is excellent in hydration resistance; an aluminum alloy having excellent corrosion resistance such as an aluminum copper alloy; or one subjected to surface treatment by anodizing or titanium deposition.

In the electrolytic solution, it is preferred that, in addition to the electrolyte described in the first embodiment, a compound for preventing fluorination of the cathode, for example, a nitro compound such as p-nitrobenzoic acid, p-nitrophenol or m-nitroacetophenone; or an acidic phosphoric ester such as monobutyl phosphate, dibutyl phosphate, dioctyl phosphate or monooctyl octylphosphonate is added to the electrolytic solution.

The electrolytic solution advantageously has a lower moisture content, and generally an electrolytic solution having a moisture content of 5,000 ppm or less is used. The electrolytic solution preferably has a moisture content of 1,000 ppm or less, especially preferably 100 ppm or less. It is preferred that the water concentration of the electrolytic solution in the capacitor is 1% by weight or less. For preventing moisture from mixing into the capacitor, the moisture content of the atmosphere for the capacitor assembling is preferably 50% or less, especially preferably 10% or less, in terms of a relative humidity. The moisture content of the atmosphere is advantageously as low as possible.

In the aluminum electrolytic capacitor of the present invention, when the above-obtained aluminum electrolytic capacitor is heated at 125° C. for 50 hours, and then the surface of the cathode in the capacitor is analyzed by X-ray photoelectron spectroscopy (hereinafter, frequently referred to as "XPS"), the cathode has a bond energy of the peak top of Al2p spectrum of 74.0 to 75.8 eV. The bond energy of the Al2p spectrum represents the bonding state of aluminum. The bond energy in the range of 74.0 to 75.8 eV indicates that the cathode contains much aluminum having an Al—O bond. In the range of larger than 75.8 eV, the cathode contains much aluminum having an Al—F bond, and such a cathode is difficult to maintain the electrostatic capacity and equivalent series resistance at a high level for a long term. On the other hand, in the range of smaller than 74.0 eV, the cathode contains much aluminum in a metallic state.

The XPS analysis is specifically conducted as follows.

First, the aluminum electrolytic capacitor is heated in a thermostatic chamber at 125° C. for 50 hours, and then left to cool at room temperature. The capacitor is disassembled to take the cathode foil out. The cathode foil is washed with distilled water and acetone and dried, and then subjected to sputtering by Ar ions at 2 kV for 2 minutes to clean the surface, followed by XPS analysis. In the XPS analysis, an Al—Kα line is used as a source of X-ray, and the measurement region has a diameter of 800 nm. Measurements are conducted in respect of three sites to determine an average of their measurements. With respect to the capacitor of a spirally-wound element structure, the outermost periphery portion of the cathode at which the cathode is likely to suffer corrosion is used in the analysis.

The electrolytic solution comprising an onium salt containing fluorine-containing anions as an electrolyte has an electric conductivity of 5 to 30 mS/cm at 25° C. and a withstand voltage of 100 to 250 V at 125° C., and has a feature such that the electrolytic solution has both high electric conductivity and high withstand voltage as compared to a conventional non-fluorine-containing anion electrolytic solution. Especially, the electrolytic solution comprising a quaternary amidinium salt of tetrafluoroaluminate as an electrolyte and γ-butyrolactone as a solvent has extremely excellent properties such that it has an electric conductivity of 20 mS/cm or more and a withstand voltage of 150 V or more, and an aluminum electrolytic capacitor using this electrolytic solution has low impedance and high withstand voltage as well as excellent heat stability. However, in this aluminum electrolytic capacitor, a reaction between the onium salt containing fluorine-containing anions and the aluminum foil of the cathode in the capacitor is likely to take place, as a result, the surface of the cathode contains many Al—F bonds, causing problems in that the life properties including the equivalent series resistance (ESR) deteriorate, or blistering of the capacitor due to generation of gas occurs. However, in the aluminum electrolytic capacitor of the present invention, the above problems do not occur because of the restriction of the moisture content of the electrolytic solution, the addition of an auxiliary and the selection of the material for the cathode prevent fluorination of the cathode.

In the third embodiment, the present invention is directed to an electrolytic solution for electrolytic capacitor, comprising a quaternary cyclic amidinium tetrafluoroaluminate represented by the formula (1) above and a solvent, wherein the electrolytic solution contains compounds represented by the formulae (2) to (4) above in a total amount of 0.6% by weight or less. Further, the present invention is directed to an electrolytic capacitor using the electrolytic solution.

The electrolytic solution for electrolytic capacitor of the present invention comprises a tetrafluoroaluminate represented by the formula (1).

Examples of alkyl groups represented by $R^1$ to $R^3$ include alkyl groups having 1 to 12 carbon atoms, preferably 1 to 4 carbon atoms, such as a methyl group, an ethyl group, a n-propyl group, an i-propyl group, a n-butyl group, a n-pentyl group and a n-hexyl group. Examples of cycloalkyl groups include cycloalkyl groups having 3 to 8 carbon atoms, preferably 5 to 7 carbon atoms, such as a cyclopropyl group, a cyclobutyl group, a cyclopentyl group and a cyclohexyl group. Examples of aryl groups include aryl groups having 6 to 14 carbon atoms, preferably 6 to 10 carbon atoms, such as a phenyl group, a tolyl group and a naphthyl group. Examples of aralkyl groups include aralkyl groups having 7 to 11 carbon atoms, preferably 7 to 8 carbon atoms, such as a benzyl group, a phenethyl group and a naphthylmethyl group.

These alkyl groups, cycloalkyl groups, aryl groups and aralkyl groups may have a substitutent(s), and examples of such substitutents include alkyl groups having 1 to 6 carbon atoms such as a methyl group, an ethyl group, a n-propyl group, an i-propyl group, a n-butyl group, a n-pentyl group and a n-hexyl group; cycloalkyl groups having 3 to 6 carbon atoms such as a cyclopropyl group, a cyclobutyl group, a cyclopentyl group and a cyclohexyl group; aryl groups having 6 to 10 carbon atoms such as a phenyl group, a tolyl group and a naphthyl group; aralkyl groups having 7 to 11 carbon atoms such as a benzyl group, a phenethyl group and a naphthylmethyl group; alkoxy groups having 1 to 6 carbon atoms such as a methoxy group, an ethoxy group, a n-propoxy group and an i-propoxy group; a hydroxyl group, an amino group, a nitro group, a cyano group, a carboxyl group, a formyl group and a carbonyl group.

In the substitutents represented by $R^1$ to $R^3$ above, preferred are alkyl groups having 2 carbon atoms or less, i.e., a methyl group and an ethyl group since an ion having a lower molecular weight has larger mobility so that an electrolytic solution having higher electric conductivity is obtainable.

Examples of substitutents represented by X include alkylene groups having 1 to 4 carbon atoms, preferably 2 to 3 carbon atoms, such as a methylene group, an ethylene group, a trimethylene group and a tetramethylene group; and arylene groups having 6 to 14 carbon atoms, preferably 6 carbon atoms, such as a 1,2-phenylene group and a 2,3-naphthylene group.

These alkylene groups and arylene groups may have a substitutent(s), and examples of such substitutents include alkyl groups having 1 to 12 carbon atoms such as a methyl group, an ethyl group, a n-propyl group, an i-propyl group, a n-butyl group, a n-pentyl group and a n-hexyl group; cycloalkyl groups having 3 to 14 carbon atoms such as a cyclopropyl group, a cyclobutyl group, a cyclopentyl group, a cyclohexyl group and an adamantyl group; aryl groups having 6 to 10 carbon atoms such as a phenyl group, a tolyl group and a naphthyl group; aralkyl groups having 7 to 11 carbon atoms such as a benzyl group, a 1-phenylethyl group, a 2-phenylethyl group and a 2-naphthylmethyl group; a hydroxyl group, an amino group, a nitro group, a cyano group, a carboxyl group and a formyl group.

In the substitutents represented by X above, preferred is an alkylene group having 2 to 3 carbon atoms, i.e., an ethylene group or a trimethylene group. When X is an ethylene group or a trimethylene group, the tetrafluoroaluminate of the formula (1) is a five-membered or six-membered cyclic amidinium compound, which is a compound thermally or chemically stable and also has an effect to prevent the aluminum electrode from suffering corrosion. An ion having a lower molecular weight has larger mobility so that an electrolytic solution having a higher electric conductivity is obtainable, and therefore, it is preferred that X has no substitutent or has a substitutent(s) having a lower molecular weight such as a methyl group or an ethyl group.

In the compound represented by the formula (1), any of two selected from $R^1$ to $R^3$ and X may be connected together to form a ring, and the ring may have a nitrogen atom(s) in addition to the two nitrogen atoms in the formula (1).

Specific examples of the compounds represented by the formula (1) include tetrafluoroaluminate salts of quaternary imidazolinium, quaternary tetrahydropyridinium or quaternary amidinium having a functional group such as a hydroxyl group or an alkoxy group. Specific examples of quaternary imidazolinium, quaternary tetrahydropyridinium and quaternary amidinium having a functional group such as a hydroxyl group or an alkoxy group, are as mentioned in the first embodiment.

Of these, from the viewpoint of obtaining an electrolytic solution having high electric conductivity and preventing corrosion of aluminum in the cathode, preferred is a quaternary imidazolinium, especially, more preferred are 1-ethyl-2,3-dimethylimidazolinium and 1,2,3,4-tetramethylimidazolinium.

The molecular weight of the compound of the formula (1) is generally 99 or more, 281 or less, especially preferably 113 or more, 141 or less.

In the formula (2), examples of alkyl groups represented by $R^{11}$ to $R^{13}$ include alkyl groups having 1 to 12 carbon atoms, particularly 1 to 4 carbon atoms, such as a methyl group, an ethyl group, a n-propyl group, an i-propyl group, a n-butyl group, a n-pentyl group and a n-hexyl group. Examples of cycloalkyl groups include cycloalkyl groups having 3 to 12 carbon atoms, particularly 5 to 7 carbon atoms, such as a cyclopropyl group, a cyclobutyl group, a cyclopentyl group and a cyclohexyl group. Examples of aryl groups include aryl groups having 6 to 14 carbon atoms, particularly 6 to 10 carbon atoms, such as a phenyl group, a tolyl group and a naphthyl group. Examples of aralkyl groups include aralkyl groups having 7 to 11 carbon atoms, particularly 7 to 9 carbon atoms, such as a benzyl group, a 1-phenylethyl group and a 2-naphthylmethyl group.

These alkyl groups, cycloalkyl groups, aryl groups and aralkyl groups may have a substitutent(s), and examples of such substitutents include alkyl groups having 1 to 6 carbon atoms such as a methyl group, an ethyl group, a n-propyl group, an i-propyl group, a n-butyl group, a n-pentyl group and a n-hexyl group; cycloalkyl groups having 3 to 6 carbon atoms such as a cyclopropyl group, a cyclobutyl group, a cyclopentyl group and a cyclohexyl group; aryl groups having 6 to 10 carbon atoms such as a phenyl group, a tolyl group and a naphthyl group; aralkyl groups having 7 to 11 carbon atoms such as a benzyl group, a phenethyl group and a naphthylmethyl group; alkoxy groups having 1 to 6 carbon atoms such as a methoxy group, an ethoxy group, a n-propoxy group and an i-propoxy group; a hydroxyl group, an amino group, a nitro group, a cyano group, a carboxyl group, a formyl group and a carbonyl group.

In the substitutents represented by $R^{11}$ to $R^{13}$ above, the substitutent having a lower molecular weight has a higher molar concentration in terms of the same weight concentration, and hence tends to increase the leakage current of the capacitor.

Examples of substitutents represented by $X^1$ include alkylene groups having 1 to 4 carbon atoms, particularly 2 to 3 carbon atoms, such as a methylene group, an ethylene group, a trimethylene group and a tetramethylene group; and arylene groups having 6 to 14 carbon atoms, particularly 6 carbon atoms, such as a 1,2-phenylene group and a 2,3-naphthylene group.

These alkylene groups and arylene groups may have a substitutent(s), and examples of such substitutents include alkyl groups having 1 to 12 carbon atoms such as a methyl group, an ethyl group, a n-propyl group, an i-propyl group, a n-butyl group, a n-pentyl group and a n-hexyl group; cycloalkyl groups having 3 to 14 carbon atoms such as a cyclopropyl group, a cyclobutyl group, a cyclopentyl group, a cyclohexyl group and an adamantyl group; aryl groups having 6 to 10 carbon atoms such as a phenyl group, a tolyl group and a naphthyl group; aralkyl groups having 7 to 11 carbon atoms such as a benzyl group, a 1-phenylethyl group, a 2-phenylethyl group and a 2-naphthylmethyl group; a hydroxyl group, an amino group, a nitro group, a cyano group, a carboxyl group and a formyl group.

In the compound represented by the formula (2), any of two selected from $R^{11}$ to $R^{13}$ and $X^1$ may be connected together to form a ring, and the ring may have a nitrogen atom(s) in addition to the two nitrogen atoms in the formula (2).

Specific examples of the compounds represented by the formula (2) include amide compounds, for example: formamide such as N-methyl-N-(2-methylaminoethyl)formamide, N-ethyl-N-(2-methylaminoethyl)formamide, N-(2-ethylaminoethyl)-N-methylformamide, N-ethyl-N-(2-ethylaminoethyl)formamide, N-methyl-N-(2-n-propylaminoethyl)formamide, N-(2-methylaminoethyl)-N-n-propylformamide, N-butyl-N-(2-methylaminoethyl)formamide, N-(2-n-butylaminoethyl)-N-methylformamide, N-methyl-N-(1-methyl-2-methylaminoethyl)formamide, N-methyl-N-(2-methyl-2-methylaminoethyl)formamide, N-methyl-N-(2-phenylaminoethyl)formamide, N-(2-methylaminoethyl)-N-phenylformamide, N-benzyl-N-(2-methylaminoethyl)formamide, N-(2-benzylaminoethyl)-N-methylformamide, N-methyl-N-(2-methylaminopropyl)formamide, and N-ethyl-N-(2-ethylaminopropyl)formamide;

acetamide such as N-methyl-N-(2-methylaminoethyl)acetamide, N-ethyl-N-(2-methylaminoethyl)acetamide, N-(2-ethylaminoethyl)-N-methylacetamide, N-ethyl-N-(2-ethylaminoethyl)acetamide, N-methyl-N-(2-n-propylaminoethyl)acetamide, N-(2-methylaminoethyl)-N-n-propylacetamide, N-methyl-N-(2-methyl-2-n-propylaminoethyl)acetamide, N-(1-methyl-2-methylaminoethyl)-N-n-propylacetamide, N-methyl-N-(1-methyl-2-methylaminoethyl)acetamide, N-methyl-N-(2-methyl-2-methylaminoethyl)acetamide, N-ethyl-N-(1-methyl-2-methylaminoethyl)acetamide, N-methyl-N-(2-phenylaminoethyl)acetamide, N-(2-methylaminoethyl)-N-phenylacetamide, N-(2-ethylaminoethyl)-N-phenylacetamide, N-benzyl-N-(2-methylaminoethyl)acetamide, N-(2-benzylaminoethyl)-N-methylacetamide, N-methyl-N-(3-methylaminopropyl)acetamide, N-ethyl-N-(3-methylaminopropyl)acetamide, N-(3-ethylaminopropyl)-N-methylacetamide, N-ethyl-N-(3-ethylaminopropyl)acetamide, N-methyl-N-(2-methylaminophenylene)acetamide and N-ethyl-N-(3-methyl-3-methylaminopropyl)acetamide;

propionamide such as N-ethyl-N-(2-methylaminoethyl)propionamide, N-(2-ethylaminoethyl)-N-methylpropionamide, N-methyl-N-(2-methylaminoethyl)propionamide, N-methyl-N-(1-methyl-2-methylaminoethyl)propionamide, N-methyl-N-(2-methyl-2-methylaminoethyl)propionamide, N-ethyl-N-(3-ethylaminopropyl)propionamide, N-methyl-N-(3-methylaminopropyl)propionamide, N-ethyl-N-(3-methylaminopropyl)propionamide, N-(3-ethylaminopropyl)-N-methylpropionamide and N-isopropyl-N-(2-ethylaminoethyl)propionamide;

aliphatic amide such as N-methyl-N-(2-methylaminoethyl)butylamide, N-methyl-N-(2-methylaminoethyl)pentanamide, N-methyl-N-(2-methylaminoethyl)hexanamide, N-methyl-N-(2-methylaminoethyl)heptanamide, N-methyl-N-(2-methylaminoethyl)octanamide, N-methyl-N-(2-methylaminoethyl)dodecanamide, N-methyl-N-(2-methylaminoethyl)hexadecanamide, N-butyl-N-(2-ethylaminoethyl)butylamide and N-(2-butylaminoethyl)-N-isobutylamide;

aromatic amide such as N-methyl-N-(2-methylaminoethyl)benzamide and N-methyl-N-(2-methylaminoethyl)phenylacetamide; and cyclic amide such as N-(3-methylaminopropyl)tetramethyleneimine-2-one, 1,6-diazacyclononane-2-one, N-(3-methylaminopropyl)hexamethyleneimine-2-one, N-(2-methylaminoethyl)hexamethyleneimine-2-one and 1,8-diazacycloundecane-2-one.

Other specific examples include amide compounds having a substitutent(s) such as N-methyl-N-(2-methylaminoethyl)-(2-hydroxypropion)amide, N-(2-hydroxyethyl)-N-(2-methylaminoethyl)acetamide, N-[2-(2-hydroxyethyl)aminoethyl]-N-methylacetamide, N-methyl-N-(2-methylaminoethyl)-(2-ethoxyacet)amide, N-(2-methoxyethyl)-N-(2-methylaminoethyl)acetamide, N-[2-(2-methoxyethyl)aminoethyl]-N-methylacetamide, N-ethyl-N-(2-methyl-2-methylaminoethyl)ethoxyacetamide, N-[2-(n-butane-3-one-yl-amino)ethyl]-N-methylacetamide, N-[2-(propane-3-one-yl-amino)ethyl]-N-methylacetamide, N-(2-hydroxy-3-methylaminopropyl)-N-methylacetamide and N-cyanomethyl-N-(2-ethylaminoethyl)acetamide.

Among these, representative examples of impurities include:

formamide such as N-methyl-N-(2-methylaminoethyl)formamide, N-ethyl-N-(2-methylaminoethyl)formamide, N-(2-ethylaminoethyl)-N-methylformamide, N-ethyl-N-(2-ethylaminoethyl)formamide, N-methyl-N-(1-methyl- 2-methylaminoethyl)formamide, N-methyl-N-(2-methyl-2-methylaminoethyl)formamide, N-methyl-N-(2-phenylaminoethyl)formamide, N-(2-methylaminoethyl)-N-phenylformamide, N-benzyl-N-(2-methylaminoethyl) formamide and N-(2-benzylaminoethyl)-N-methylformamide;

acetamide such as N-(1-methyl-2-aminoethyl)acetamide, N-(2-methyl-2-aminoethyl)acetamide, N-methyl-N-(2-methylaminoethyl)acetamide, N-(2-methyl-2-methylaminoethyl)acetamide, N-ethyl-N-(2-methylaminoethyl)acetamide, N-(2-ethylaminoethyl)-N-methylacetamide, N-methyl-N-(1-methyl-2-methylaminoethyl)acetamide, N-methyl-N-(2-methyl-2-methylaminoethyl)acetamide, N-methyl-N-(2-phenylaminoethyl)acetamide, N-(2-methylaminoethyl)-N-phenylacetamide, N-benzyl-N-(2-methylaminoethyl)acetamide and N-(2-benzylaminoethyl)-N-methylacetamide;

propionamide such as N-methyl-N-(2-methylaminoethyl) propionamide, N-methyl-N-(1-methyl-2-methylaminoethyl)propionamide and N-methyl-N-(2-methyl-2-methylaminoethyl)propionamide;

aliphatic amide such as N-methyl-N-(2-methylaminoethyl) butylamide, N-methyl-N-(2-methylaminoethyl)pentanamide, N-methyl-N-(2-methylaminoethyl)hexanamide, N-methyl-N-(2-methylaminoethyl)heptanamide and N-methyl-N-(2-methylaminoethyl)octanamide; and aromatic amide such as N-methyl-N-(2-methylaminoethyl) benzamide and N-methyl-N-(2-methylaminoethyl)benzylamide.

Of these, compounds having a substituent(s) having a lower molecular weight such as N-(1-methyl-2-aminoethyl) acetamide, N-(2-methyl-2-aminoethyl)acetamide, N-methyl-N-(1-methyl-2-aminoethyl)acetamide, N-(2-methyl-2-methylaminoethyl)acetamide, N-(2-ethylaminoethyl) acetamide, N-(2-aminoethyl)-N-ethylacetamide, N-(2-ethylaminoethyl)-N-methylacetamide, N-ethyl-N-(2-methylaminoethyl)acetamide, N-methyl-N-(1-methyl-2-methylaminoethyl)acetamide and N-methyl-N-(2-methyl-2-methylaminoethyl)acetamide, have a higher molar concentration in terms of the same weight concentration, and hence tend to further increase the leakage current of the capacitor.

The molecular weight of the compound of the formula (2) present in the electrolytic solution is generally 100 or more, 400 or less, frequently 110 or more, 220 or less.

In the formula (3), examples of alkyl groups represented by $R^{22}$ and $R^{23}$ include alkyl groups having 1 to 12 carbon atoms, particularly 1 to 4 carbon atoms, such as a methyl group, an ethyl group, a n-propyl group, an i-propyl group, a n-butyl group, a n-pentyl group and a n-hexyl group. Examples of cycloalkyl groups include cycloalkyl groups having 3 to 12 carbon atoms, particularly 5 to 7 carbon atoms, such as a cyclopropyl group, a cyclobutyl group, a cyclopentyl group and a cyclohexyl group. Examples of aryl groups include aryl groups having 6 to 14 carbon atoms, particularly 6 to 10 carbon atoms, such as a phenyl group, a tolyl group and a naphthyl group. Examples of aralkyl groups include aralkyl groups having 7 to 11 carbon atoms, particularly 7 to 9 carbon atoms, such as a benzyl group, a 1-phenylethyl group and a 2-naphthylmethyl group.

These alkyl groups, cycloalkyl groups, aryl groups and aralkyl groups may have a substituent(s), and examples of such substituents include alkyl groups having 1 to 6 carbon atoms such as a methyl group, an ethyl group, a n-propyl group, an i-propyl group, a n-butyl group, a n-pentyl group and a n-hexyl group; cycloalkyl groups having 3 to 6 carbon atoms such as a cyclopropyl group, a cyclobutyl group, a cyclopentyl group and a cyclohexyl group; aryl groups having 6 to 10 carbon atoms such as a phenyl group, a tolyl group and a naphthyl group; aralkyl groups having 7 to 11 carbon atoms such as a benzyl group, a phenethyl group and a naphthylmethyl group; alkoxy groups having 1 to 6 carbon atoms such as a methoxy group, an ethoxy group, a n-propoxy group and an i-propoxy group; a hydroxyl group, an amino group, a nitro group, a cyano group, a carboxyl group, a formyl group and a carbonyl group.

In the substitutents represented by $R^{22}$ and $R^{23}$ above, the substitutent having a lower molecular weight has a higher molar concentration in terms of the same weight concentration, and hence tends to further increase the leakage current of the capacitor.

Examples of substitutents represented by $X^2$ include alkylene groups having 1 to 4 carbon atoms, particularly 2 to 3 carbon atoms, such as a methylene group, an ethylene group, a trimethylene group and a tetramethylene group; and arylene groups having 6 to 14 carbon atoms, particularly 6 carbon atoms, such as a 1,2-phenylene group and a 2,3-naphthylene group.

These alkylene groups and arylene groups may have a substitutent(s), and examples of such substitutents include alkyl groups having 1 to 12 carbon atoms such as a methyl group, an ethyl group, a n-propyl group, an i-propyl group, a n-butyl group, a n-pentyl group and a n-hexyl group; cycloalkyl groups having 3 to 14 carbon atoms such as a cyclopropyl group, a cyclobutyl group, a cyclopentyl group, a cyclohexyl group and an adamantyl group; aryl groups having 6 to 10 carbon atoms such as a phenyl group, a tolyl group and a naphthyl group; aralkyl groups having 7 to 11 carbon atoms such as a benzyl group, a 1-phenylethyl group, a 2-phenylethyl group and a 2-naphthylmethyl group; a hydroxyl group, an amino group, a nitro group, a cyano group, a carboxyl group and a formyl group.

In the compound represented by the formula (3), any of two selected from $R^{22}$, $R^{23}$ and $X^2$ may be connected together to form a ring, and the ring may have a nitrogen atom(s) in addition to the two nitrogen atoms in the formula (3). The amidine group may be protonated.

Specific examples of the compounds represented by the formula (3) include the following:

1) Imidazoline

Examples include 2-methylimidazoline, 1,2-dimethylimidazoline, 2,4-dimethylimidazoline, 1-ethyl-2-methylimidazoline, 1,2,4-trimethylimidazoline, 2-ethylimidazoline, 2-ethyl-1-methylimidazoline, 1,2-diethylimidazoline, 3-methyl-2-n-undecylimidazoline and 3-methyl-2-n-heptadecylimidazoline.

2) Tetrahydropyrimidine

Examples include 1,2-dimethyltetrahydropyrimidine, 1,2-diethyltetrahydropyrimidine, 2-ethyl-1-methyltetrahydropyrimidine, 1-ethyl-2-methyltetrahydropyrimidine, 1,5-diazabicyclo[4.3.0]nonene-5 and 1,8-diazabicyclo[5.4.0] undecene-7.

3) Cyclic Amidine Having a Functional Group Such as a Hydroxyl Group or an Alkoxy Group Examples include 2-(2'-hydroxy)ethyl-3-methylimidazoline, 1-(2'-hydroxy)ethyl-2-methylimidazoline, 2-ethoxymethyl-1-methylimidazoline, 1-ethoxymethyl-2-methylimidazoline and 1,2-dimethyl-1,4-dihydropyridinium.

Representative examples of impurities represented by the formula (3) include 1-ethyl-2-methylimidazoline, 1,2,4-trimethylimidazoline, 2,4-dimethylimidazoline and 2-imidazoline.

The molecular weight of the compound represented by the formula (3) present in the electrolytic solution is generally 100 or more, 400 or less, frequently 110 or more, 220 or less.

In the formula (4), examples of alkyl groups represented by to $R^{31}$, $R^{33}$ and $R^{34}$ include alkyl groups having 1 to 12 carbon atoms, particularly 1 to 4 carbon atoms, such as a methyl group, an ethyl group, a n-propyl group, an i-propyl group, a n-butyl group, a n-pentyl group and a n-hexyl group. Examples of cycloalkyl groups include cycloalkyl groups having 3 to 12 carbon atoms, particularly 5 to 7 carbon atoms, such as a cyclopropyl group, a cyclobutyl group, a cyclopentyl group and a cyclohexyl group. Examples of aryl groups include aryl groups having 6 to 14 carbon atoms, particularly 6 to 10 carbon atoms, such as a phenyl group, a tolyl group and a naphthyl group. Examples of aralkyl groups include aralkyl groups having 7 to 11 carbon atoms, particularly 7 to 9 carbon atoms, such as a benzyl group, a 1-phenylethyl group and a 2-naphthylmethyl group.

These alkyl groups, cycloalkyl groups, aryl groups, and aralkyl groups may have a substitutent(s), and examples of such substitutents include alkyl groups having 1 to 6 carbon atoms such as a methyl group, an ethyl group, a n-propyl group, an i-propyl group, a n-butyl group, a n-pentyl group, and a n-hexyl group; cycloalkyl groups having 3 to 6 carbon atoms such as a cyclopropyl group, a cyclobutyl group, a cyclopentyl group and a cyclohexyl group; aryl groups having 6 to 10 carbon atoms such as a phenyl group, a tolyl group and a naphthyl group; aralkyl groups having 7 to 11 carbon atoms such as a benzyl group, a phenethyl group and a naphthylmethyl group; alkoxy groups having 1 to 6 carbon atoms such as a methoxy group, an ethoxy group, a n-propoxy group and an i-propoxy group; a hydroxyl group, an amino group, a nitro group, a cyano group, a carboxyl group, a formyl group and a carbonyl group.

In the substitutents represented by $R^3$, $R^{33}$ and $R^{34}$ above, the substitutent having a lower molecular weight has a higher molar concentration in terms of the same weight concentration, and hence tends to further increase the leakage current of the capacitor.

Examples of substitutents represented by $X^3$ include alkylene groups having 1 to 4 carbon atoms, particularly 2 to 3 carbon atoms, such as a methylene group, an ethylene group, a trimethylene group and a tetramethylene group; and arylene groups having 6 to 14 carbon atoms, particularly 6 carbon atoms, such as a 1,2-phenylene group and a 2,3-naphthylene group.

These alkylene groups and arylene groups may have a substitutent(s), and examples of such substitutents include alkyl groups having 1 to 12 carbon atoms such as a methyl group, an ethyl group, a n-propyl group an i-propyl group, a n-butyl group, a n-pentyl group and a n-hexyl group; cycloalkyl groups having 3 to 14 carbon atoms such as a cyclopropyl group, a cyclobutyl group, a cyclopentyl group, a cyclohexyl group and an adamantyl group; aryl groups having 6 to 10 carbon atoms such as a phenyl group, a tolyl group and a naphthyl group; aralkyl groups having 7 to 11 carbon atoms such as a benzyl group, a 1-phenylethyl group, a 2-phenylethyl group and a 2-naphthylmethyl group; a hydroxyl group, an amino group, a nitro group, a cyano group, a carboxyl group and a formyl group.

In the compound represented by the formula (4), any of two selected from $R^{31}$, $R^{33}$ and $X^3$ may be connected together to form a ring, and the ring may have a nitrogen atom(s) in addition to the two nitrogen atoms in the formula (4).

Representative examples of impurity compounds represented by the formula (4) include 1-ethyl-2-methoxycarbonylmethyl-3-methylimidazolinium and 2-methoxycarbonylmethyl-1,3,4-trimethylimidazolinium. These compounds have a relatively low molecular weight and hence have a higher molar concentration in terms of the same weight concentration, and tend to further increase the leakage current of the capacitor.

The molecular weight of the cation of the compound of the formula (4) present in the electrolytic solution is generally 170 or more, 470 or less, frequently 180 or more, 290 or less.

The present invention has a characteristic feature such that the electrolytic solution contains compounds represented by the formulae (2) to (4) in a total amount of 0.6% by weight or less. When the total amount of the compounds represented by the formulae (2) to (4) in the electrolytic solution is more than 0.6% by weight, the leakage current of the resultant capacitor becomes high. The total amount of the compounds is preferably 0.5% by weight or less, especially preferably 0.4% by weight or less. With respect to the lower limit, there is no particular limitation, and it is considered most preferred that the electrolytic solution does not contain any of these compounds.

The total amount of the compounds represented by the formulae (2) to (4) can be easily determined by analyzing the electrolytic solution.

As a method for quantitative analysis of the impurities, liquid chromatography, ion chromatography, gas chromatography, capillary electrophoresis, GC/MS, LC/MS, and NMR are preferred, and especially preferred is liquid chromatography which is excellent in analysis sensitivity and analysis accuracy.

The cation portion of the salt of the formula (1) is generally synthesized using, as an intermediate raw material, an alkyl alkylcarbonate cyclic amidinium synthesized by an alkylation reaction between a cyclic amidine compound represented by the formula (3) and a dialkyl carbonate. The cyclic amidine compound represented by the formula (3) and the alkyl alkylcarbonate cyclic amidinium undergo a hydrolysis reaction due to moisture to form a compound represented by the formula (2). In addition, the side reaction forms a compound represented by the formula (4). Therefore, when the operation of the alkylation reaction between the cyclic amidine compound and the dialkyl carbonate is inappropriate or purification after the reaction is not satisfactory, the cation portion of the salt of the formula (1) accompanies the compounds represented by the formulae (2) to (4). Consequently, the compounds of the formulae (2) to (4) are frequently present in the electrolytic solution in a concentration of about 0.8% by weight.

As examples of methods for reducing the concentration of the compounds of the formulae (2) to (4) in the electrolytic solution, there can be mentioned a method in which raw materials having a low moisture content are used in the synthesis of the salt represented by the formula (1); the reaction is carried out in an inert gas atmosphere to suppress the hydrolysis reaction; and a method in which the reaction temperature is controlled to suppress the reaction in which a carbonyl compound is by-produced. In addition, there can be employed a method in which the salt represented by the formula (1) is synthesized, and then impurities are removed by recrystallization. Especially preferred is the method using recrystallization since an electrolytic solution having the highest purity can be obtained.

The lower the concentration of the salt represented by the formula (1) in the electrolytic solution of the present invention is, the withstand voltage of the electrolytic solution for electrolytic capacitor tends to become higher, and therefore the salt concentration may be determined depending on a desired rated voltage of a capacitor, and the electrolytic solution may be in the form of either a concentrated solution having a concentration as high as 50% by weight or a normal temperature molten salt, but the salt concentration is generally 5% by weight or more, preferably 10% by weight or more, and is generally 40% by weight or less, preferably 35% by weight or less. When the concentration of the salt represented by the formula (1) in the electrolytic solution is too low, the electric conductivity of the electrolytic solution is low, and when the concentration is too high, the viscosity of the electrolytic solution is increased or precipitation is likely to occur in the electrolytic solution at a low temperature.

The electrolytic solution of the present invention may contain a salt obtained by replacing the tetrafluoroaluminate ion portion of the salt represented by the formula (1) by another anion. Specific examples of the anions include fluorine-containing inorganic ions such as a tetrafluoroboric acid ion, a hexafluorophosphoric acid ion, a hexafluoroarsenic acid ion, a hexafluoroantimonic acid ion, a hexafluoroniobic acid ion and a hexafluorotantalic acid ion; carboxylic acid ions such as a hydrogenphthalic acid ion, a hydrogenmaleic acid ion, a salicylic acid ion, a benzoic acid ion and an adipic acid ion; sulfonic acid ions such as a benzenesulfonic acid ion, a toluenesulfonic acid ion, a dodecylbenzenesulfonic acid ion, a trifluoromethanesulfonic acid ion and perfluorobutanesulfonic acid; inorganic oxoacid ions such as a boric acid ion and a phosphoric acid ion; bis(trifluoromethanesulfonyl)imide ion, a bis(pentafluoroethanesulfonyl)imide ion, a tris(trifluoromethanesulfonyl)methide ion, a perfluoroalkylfluoroborate ion, a perfluoroalkylfluorophosphate ion; and quadridentate boric acid ions such as a borodicatecholate, a borodiglycolate, a borodisalicylate, a borotetrakis(trifluoroacetato) and a bis(oxalato)borate.

When the electrolytic solution contains a salt other than the salt represented by the formula (1), the concentration of the salt other than the salt represented by the formula (1) in the electrolytic solution is generally 20% by weight or less, preferably 10% by weight or less. When the electrolytic solution contains a salt other than the salt represented by the formula (1), the concentration of the salt other than the salt represented by the formula (1) in the electrolytic solution is generally 20% by weight or less, preferably 10% by weight or less.

Examples of solvents for the electrolytic solution include carbonic esters, carboxylic esters, phosphoric esters, nitriles, amides, sulfones, alcohols, ethers, sulfoxides, ureas and urethanes. The solvent is as mentioned in the first embodiment. The moisture content of the solvent considerably affects the moisture content of the resultant electrolytic solution, and a solvent having generally a moisture content of 5,000 ppm or less, preferably 1,000 ppm or less, more preferably 100 ppm or less is used.

Examples of electrolytic capacitors using the electrolytic solution of the present invention include aluminum electrolytic capacitors, tantalum electrolytic capacitors and niobium electrolytic capacitors.

The basic construction of the aluminum electrolytic capacitor, anode, cathode and separator as well as the production of the aluminum electrolytic capacitor are as mentioned in the first embodiment.

A cathode foil having a titanium nitride thin film formed on the surface of an etched aluminum foil (for example, described in Japanese Prov. Patent Publication No. 186054/1997) may be used.

In the fourth embodiment, the present invention is directed to a method for preparing an organic onium tetrafluoroaluminate which comprises reacting (i) hydrogen fluoride and/or fluorosilicic acid; (ii) an organic onium salt; and (iii) an aluminum compound with the proviso that aluminum trifluoride is excluded, and/or metallic aluminum.

One of the raw materials in the method of the present invention is an organic onium salt, preferably an organic onium salt represented by the following formulae (5) to (7):

QOH            (5)

QROCO$_2$            (6)

QX            (7)

wherein:
Q represents an organic onium,
R represents a hydrogen atom or an alkyl group having 10 carbon atoms or less, and
X represents a halogen atom.

Examples of alkyl groups having 10 carbon atoms or less defined by R include a methyl group, an ethyl group, a n-propyl group, an i-propyl group, a n-butyl group, a n-pentyl group, a n-hexyl group, a n-octyl group and a n-decyl group. Examples of halogen atoms defined by X include a fluorine atom, a chlorine atom and a bromine atom.

In the present invention, among the organic onium salts, a hydroxide, a methylcarbonate, a hydrogencarbonate or a fluoride is preferably used, and a hydroxide, a methylcarbonate or a hydrogencarbonate is more preferably used.

The halide of QX above needs a reaction for introducing a halogen, however, in the method of the present invention, hydrogen fluoride and/or fluorosilicic acid is used in the reaction, and hence the reaction step for introducing a halogen is not required, which is commercially advantageous. From this point of view, it is desired that an organic onium salt containing no halogen atom is used.

In the present invention, the organic onium stands for a geneal term for compounds containing an element having a lone pair (e.g., nitrogen or phosphorus) to which a proton or another cation coordinates, and there is no particular limitation, but a compound represented by the following formula (8) is preferably used:

(8)

wherein:
each of $R_1$ to $R_4$ independently represents a hydrogen atom, an alkyl group which may be substituted, a cycloalkyl group which may be substituted, an aryl group which may be substituted or an aralkyl group which may be substituted, with the proviso that two or more substitutents of $R_1$ to $R_4$ are not hydrogen atoms at the same time; or
part of or all of $R_1$ to $R_4$ may be connected together to form a ring, and when the ring is formed, the ring may have a nitrogen atom(s) on the ring composed; and
A represents a nitrogen atom or a phosphorus atom.

In the formula (8), examples of alkyl groups defined by $R_1$ to $R_4$ include alkyl groups having 1 to 20 carbon atoms, more preferably 1 to 6 carbon atoms, such as a methyl group, an ethyl group, a n-propyl group, an i-propyl group, a n-butyl group, a n-pentyl group and a n-hexyl group; examples of cycloalkyl groups include cycloalkyl groups having 3 to 20 carbon atoms, more preferably 3 to 6 carbon atoms, such as a cyclopropyl group, a cyclobutyl group, a cyclopentyl group and a cyclohexyl group; examples of aryl groups include aryl groups having 6 to 20 carbon atoms, more preferably 6 to 10 carbon atoms, such as a phenyl group, a tolyl group and a naphthyl group; and examples of aralkyl groups include aralkyl groups having 7 to 20 carbon atoms, more preferably 7 to 11 carbon atoms, such as a benzyl group, a phenethyl group and a naphthylmethyl group.

These alkyl groups, cycloalkyl groups, aryl groups and aralkyl groups may have a substitutent(s), and examples of such substitutents include a hydroxyl group, an amino group, a nitro group, a cyano group, a carboxyl group and a formyl group.

Representative examples of organic onium represented by the formula (8) above include quaternary ammonium, quaternary phosphonium, quaternary imidazolium, quaternary cyclic amidinium and ammonium. The organic onium salt involves organic onium salts to which a coordinating compound such as water or methanol coordinates.

Examples of quaternary ammonium include specific examples of tetraalkylammonium, aromatic substituted ammonium, aliphatic cyclic ammonium and ions of nitrogen-containing heterocyclic aromatic compound mentioned in the first embodiment. Examples of quaternary phosphonium and quaternary imidazolium include specific examples mentioned in the first embodiment. Examples of quaternary amidinium include specific examples of quaternary imidazolinium, quaternary tetrahydropyrimidinium and quaternary amidinium having a hydroxyl group, an ether group and the like, mentioned in the first embodiment.

Specific examples of ammonium include trimethylammonium, ethyldimethylammonium, diethylmethylammonium, triethylammonium, pyridinium, N-methylimidazolinium, 1,5-diazabicyclo[4.3.0]nonenium-5 and 1,8-diazabicyclo[5.4.0]undecenium-7.

Of these, organic oniums having 4 to 12 carbon atoms in total are preferred, especially preferred is at least one compound selected from the group consisting of tetraethylammonium, triethylmethylammonium, diethyldimethylammonium, ethyltrimethylammonium, tetramethylammonium, N,N-dimethylpyrrolidinium, N-ethyl-N-methylpyrrolidinium, 1,3-dimethylimidazolium, 1,2,3-trimethylimidazolium, 1-ethyl-3-methylimidazolium, 1-ethyl-2,3-dimethylimidazolium, 1,2,3,4-tetramethylimidazolium, 1,3-diethylimidazolium, 2-ethyl-1,3-dimethylimidazolium, 1,3-dimethyl-2-n-propylimidazolium, 1,3-dimethyl-2-n-pentylimidazolium, 1,3-dimethyl-2-n-heptylimidazolium, 1,3,4-trimethylimidazolium, 2-ethyl-1,3,4-trimethylimidazolium, 1,3-dimethylbenzimidazolium, 1-phenyl-3-methylimidazolium, 1-benzyl-3-methylimidazolium, 1-phenyl-2,3-dimethylimidazolium, 1-benzyl-2,3-dimethylimidazolium, 2-phenyl-1,3-dimethylimidazolium, 2-benzyl-1,3-dimethylimidazolium, 1,3-dimethylimidazolinium, 1,2,3-trimethylimidazolinium, 1-ethyl-3-methylimidazolinium, 1-ethyl-2,3-dimethylimidazolinium, 1,2,3,4-tetramethylimidazolinium, 1,3-diethylimidazolinium, 2-ethyl-1,3-dimethylimidazolinium, 1,3-dimethyl-2-n-propylimidazolinium, 1,3-dimethyl-2-n-pentylimidazolinium, 1,3-dimethyl-2-n-heptylimidazolinium, 1,3,4-trimethylimidazolinium, 2-ethyl-1,3,4-trimethylimidazolinium, 1-phenyl-3-methylimidazolinium, 1-benzyl-3-methylimidazolinium, 1-phenyl-2,3-dimethylimidazolinium, 1-benzyl-2,3-dimethylimidazolinium, 2-phenyl-1,3-dimethylimidazolinium and 2-benzyl-1,3-dimethylimidazolinium, and further preferred are 1-ethyl-2,3-dimethylimidazolinium and 1,2,3,4-tetramethylimidazolinium.

The organic onium salt can be used either as it is or in the form of a solution in a solvent inert to the reaction. Alternatively, the quaternization reaction mixture can be directly used. For example, the reaction mixture formed in the quaternization of 1-ethyl-2-methylimidazole by dimethyl carbonate can be directly used.

Another raw material in the method of the present invention is an aluminum compound or metallic aluminum as a source of aluminum. As the aluminum compound, any aluminum compound excluding aluminum trifluoride, can be used. For example, aluminum hydroxide, aluminum oxide, aluminum chloride, aluminum acetate, aluminum bromide, aluminum nitrate, aluminum sulfate, aluminum phosphate, potassium aluminum sulfate, aluminum silicate or alumina white can be used. Preferably, aluminum hydroxide, aluminum oxide, metallic aluminum or aluminum chloride, especially preferably aluminum hydroxide is used.

As the aluminum hydroxide, for example, aluminum hydroxide sol, dried aluminum hydroxide gel, crystalline aluminum hydroxide (e.g., diaspore, boehmite, pseudoboehmite, gibbsite, bayerite and nordstrandite) or aluminum hydroxide oxide can be used. Of these, especially preferred is gibbsite.

As the aluminum oxide, for example, alumina, alumina sol, fused alumina, activated alumina, low soda alumina or ultrafine particle of aluminum oxide can be used.

Still another raw material in the method of the present invention is hydrogen fluoride or fluorosilicic acid as a source of fluorine. Hydrogen fluoride can be used either as it is or in the form of a solution in a solvent inert to the reaction. It is preferably used in the form of hydrofluoric anhydride, a methanol solution of hydrogen fluoride or an aqueous solution of hydrogen fluoride. Fluorosilicic acid is preferably used in the form of an aqueous solution.

Examples of solvents available in the method of the present invention include water; alcohols such as methanol, ethanol, n-propanol, isopropanol and n-butanol; ketones such as acetone, methyl ethyl ketone, diethyl ketone and methyl isobutyl ketone; ethers such as diethyl ether, ethyl n-propyl ether, ethyl isopropyl ether, di-n-propyl ether, diisopropyl ether, n-propyl isopropyl ether, dimethoxyethane, methoxyethoxyethane, diethoxyethane and tetrahydrofuran; nitrites such as acetonitrile and propionitrile; hydrocarbons such as pentane, hexane, heptane, octane, cyclohexane, methylcyclohexane, benzene, toluene and xylene; and esters such as ethyl acetate, butyl acetate, dimethyl carbonate, diethyl carbonate, ethylmethyl carbonate, ethylene carbonate and propylene carbonate. Of these, preferred is water, methanol or ethanol. These solvents may be used individually or in combination.

When the amount of the hydrogen fluoride used is too large relative to aluminum as a source of aluminum, excessive fluorine is further bonded to tetrafluoroaluminate to advance the fluorination to an excess extent, so that a by-product such as pentafluoroaluminate or hexafluoroaluminate is likely to be formed, thus lowering the selectivity for the desired tetrafluoroaluminate. Therefore, from a commercial point of view, the amount of the hydrogen fluoride used desirably does not exceed 10 times, especially 8 times the molar amount of aluminum as a source of aluminum, and is generally 3 to 5 times, preferably 3.5 to 4.5 times, especially preferably 3.8 to 4.2 times the molar amount of aluminum as a source of aluminum. When the organic onium salt is a fluoride, the amount of the hydrogen fluoride used may be slightly smaller than the above value, generally 2 to 4 times, preferably 2.5 to 3.5 times, especially preferably 2.8 to 3.2 times the molar amount of aluminum as a source of aluminum.

When the amount of the fluorosilicic acid used is too large relative to aluminum as a source of aluminum, excessive fluorine is further bonded to tetrafluoroaluminate to advance the fluorination to an excess extent, so that a by-product such as pentafluoroaluminate or hexafluoroaluminate is likely to be formed, thus lowering the selectivity for the desired tetrafluoroaluminate. Therefore, from a commercial point of view, the amount of the fluorosilicic acid used desirably does not exceed 1.7 time, especially 1.3 time the molar amount of aluminum as a source of aluminum, and is generally 0.5 to 0.83 time, preferably 0.58 to 0.75 time, especially preferably 0.63 to 0.7 time the molar amount of aluminum as a source of aluminum. When the organic onium salt is a fluoride, the amount of the fluorosilicic acid used may be slightly smaller than the above value, generally 0.33 to 0.67 time, preferably 0.42 to 0.58 time, especially preferably 0.47 to 0.53 time the molar amount of aluminum as a source of aluminum.

Hydrogen fluoride and fluorosilicic acid can be used in combination in any ratio, and in this case, when the amount of these compounds is too large relative to aluminum as a source of aluminum, excessive fluorine is further bonded to tetrafluoroaluminate to advance the fluorination to an excess extent, so that a by-product such as pentafluoroaluminate or hexafluoroaluminate is likely to be formed, thus lowering the selectivity for the desired tetrafluoroaluminate. Therefore, from a commercial point of view, when the amount of hydrogen fluoride is taken as x mol and the amount of fluorosilicic acid is taken as y mol, $x+y\times 6$ desirably does not exceed 10 times, especially 8 times the molar amount of aluminum as a source of aluminum, and is generally 3 to 5 times, preferably 3.5 to 4.5 times, especially preferably 3.8 to 4.2 times the molar amount of aluminum as a source of aluminum. When the organic onium salt is a fluoride, the above amounts are respectively 2 to 4 times, 2.5 to 3.5 times and 2.8 to 3.2 times the molar amount of aluminum as a source of aluminum.

Either a single source of aluminum may be used or a plurality of sources of aluminum may be used in combination, and the amount of the aluminum used is generally 0.5 to 10 times, preferably 0.8 to 2 times, especially preferably 0.9 to 1.2 time the molar amount of the organic onium salt, in terms of an aluminum atom, and the amount of 0.9 to 1 time offers more excellent safety.

In the present invention, if desired, aluminum trifluoride can be used together with the aluminum compound or metallic aluminum. However, the use of aluminum trifluoride in a large amount is opposite to the purpose of the present invention to substitute aluminum trifluoride for another source of aluminum and fluorine. Therefore, when aluminum trifluoride is used together, it should be used in an amount of 50% or less, it is preferable to use it together in an amount of 25% or less, especially 10% or less, relative to the other source of aluminum, in terms of aluminum. As the aluminum trifluoride, it is preferred to use aluminum trifluoride trihydrate.

Examples of methods for reaction include a method in which an organic onium salt is added to hydrogen fluoride or fluorosilicic acid, and then an aluminum compound is added thereto; a method in which hydrogen fluoride or fluorosilicic acid is added to an organic onium salt, and then an aluminum compound is added thereto; a method in which hydrogen fluoride or fluorosilicic acid and an organic onium salt are added simultaneously or alternately, and then an aluminum compound is added thereto; a method in which an aluminum compound is added to hydrogen fluoride or fluorosilicic acid, and then an organic onium salt is added thereto; a method in which hydrogen fluoride or fluorosilicic acid is added to an aluminum compound, and then an organic onium salt is added thereto; a method in which hydrogen fluoride or fluorosilicic acid and an aluminum compound are added simultaneously or alternately, and then an organic onium salt is added thereto; a method in which an aluminum compound is added to an organic onium salt, and then hydrogen fluoride or fluorosilicic acid is added thereto; a method in which an organic onium salt is added to an aluminum compound, and then hydrogen fluoride or fluorosilicic acid is added thereto; a method in which an organic onium salt and an aluminum compound are added simultaneously or alternately, and then hydrogen fluoride or fluorosilicic acid is added thereto; a method in which an organic onium salt, hydrogen fluoride or fluorosilicic acid, and an aluminum compound are added simultaneously or alternately; and combinations of the above methods. Of these, preferred are a method in which an aluminum compound is added to hydrogen fluoride or fluorosilicic acid, and then an organic onium salt is added thereto; a method in which hydrogen fluoride or fluorosilicic acid is added to an aluminum compound, and then an organic onium salt is added thereto; and a method in which hydrogen fluoride or fluorosilicic acid and an aluminum compound are added simultaneously or alternately, and then an organic onium salt is added thereto. In the feeding of the hydrogen fluoride, fluorosilicic acid, aluminum compound and organic onium salt used in the reaction into a reaction vessel, they may be dissolved or dispersed in a solvent, or they may be added to a solvent preliminarily charged into the reaction vessel.

A reaction vessel having polytetrafluoroethylene lining, namely, having an acid resistance is advantageously used.

With respect to the reaction temperature, there is no particular limitation, but the reaction is generally conducted at $-20$ to $150°$ C., preferably $-10$ to $50°$ C., further preferably 0 to $25°$ C. In the present invention, when the reaction is conducted in two stages, it is preferred that the temperature of the second reaction is equal to or slightly higher than that of the first reaction.

With respect to the reaction pressure, there is no particular limitation, but the reaction is generally conducted under atmospheric pressure.

With respect to the reaction atmosphere, there is no particular limitation, and the reaction may be conducted in an atmosphere of air, but the reaction is preferably conducted in an atmosphere of inert gas such as nitrogen or argon.

When the organic onium tetrafluoroaluminate obtained by the present invention is used in an electrolytic capacitor, it is desired that the salt has a high-purity salt, and therefore the salt is, if necessary, purified by crystallization or extraction with a solvent so that it has a desired purity, and then used.

Examples of solvents for crystallization include alcohols having 4 carbon atoms or less. Examples of alcohols having 4 carbon atoms or less include methanol, ethanol, n-propanol, isopropanol, n-butanol, isobutanol, 2-butanol, t-butanol and mixtures thereof. Crystallization using the above solvent makes it possible to obtain an organic onium tetrafluoroaluminate containing a reduced impurity content efficiently.

The organic onium tetrafluoroaluminate obtained by the present invention is a useful compound used in the fields of surfactant, electrolyte for an electrochemical device such as a battery or a capacitor, phase transfer catalyst and antistatic agent, and especially useful as an electrolyte for an electrochemical device such as an electrolytic capacitor.

The electrolytic solution of the present invention uses the organic onium tetrafluoroaluminate obtained by the above-mentioned method as an electrolyte.

The electrolytic solution can contain an anion component other than the tetrafluoroaluminate ion, and specific examples of the anions include fluorine-containing inorganic ions such as a tetrafluoroboric acid ion, a hexafluorophosphoric acid ion, a hexafluoroarsenic acid ion, a hexafluoroantimonic acid ion, a hexafluoroniobic acid ion and a hexafluorotantalic acid ion; carboxylic acid ions such as a hydrogenphthalic acid ion, a hydrogenmaleic acid ion, a salicylic acid ion, a benzoic acid ion and an adipic acid ion; sulfonic acid ions such as a benzenesulfonic acid ion, a toluenesulfonic acid ion, a dodecylbenzenesulfonic acid ion, a trifluoromethanesulfonic acid ion and perfluorobutanesulfonic acid; inorganic oxo-acid ions such as a boric acid ion and a phosphoric acid ion; a bis(trifluoromethanesulfonyl)imide ion, a bis(pentafluoroethanesulfonyl)imide ion, a tris(trifluoromethanesulfonyl)methide ion, a perfluoroalkylfluoroborate ion, a perfluoroalkylfluorophosphate ion; quadridentate boric acid ions such as a borodicatecholate, a borodiglycolate, a borodisalicylate, a borotetrakis(trifluoroacetato) and a bis(oxalato)borate. For example, when the organic onium tetrafluoroaluminate and hydrogenphthalate or a hydrogenmaleate are used in combination, it is preferred that the tetrafluoroaluminate is a main component, and the amount of the tetrafluoroaluminate is preferably 50% by weight or more, more preferably 60% by weight or more, further preferably 70% by weight or more, based on the total weight of the salts, and a larger tetrafluoroaluminate amount is preferred.

The concentration of the organic onium tetrafluoroaluminate in the electrolytic solution of the present invention is preferably 5 to 40% by weight, further preferably 10 to 35% by weight. The reason for this resides in that, when the concentration is too low, the electric conductivity of the electrolytic solution is low, and when the concentration is too high, the viscosity of the electrolytic solution is increased or precipitation of the salt is likely to occur in the electrolytic solution at a low temperature. Generally, the lower the concentration is, the withstand voltage of the electrolytic solution for electrolytic capacitor tends to become higher, and therefore the optimal salt concentration can be determined depending on a desired rated voltage of a capacitor. The electrolytic solution of the present invention may be in the form of either a concentrated solution containing 50% or more of the salt or a normal temperature molten salt.

From the viewpoint of obtaining an electrolytic solution having further excellent electric conductivity, heat stability, and withstand voltage properties, it is preferred that the electrolytic solution of the present invention contains a solvent in an amount of 50% by weight or more. Examples of solvents include at least one member selected from the group consisting of carbonic esters, carboxylic esters, phosphoric esters, nitrites, amides, sulfones, alcohols and water, and a solvent selected from carbonic esters, carboxylic esters, phosphoric esters, nitrites, amides, sulfones and alcohols is preferred since the electrolytic solution using the solvent tends to exhibit stable properties for a long term. When water is used as the solvent, it is preferred that water is used in combination with another solvent to constitute part of the solvent. Specific examples of carbonic esters, carboxylic esters, phosphoric esters, nitrites, amides, sulfones and alcohols are as mentioned in the first embodiment.

From the viewpoint of obtaining an electrolytic solution having excellent conductivity, as the solvent, it is preferred to use a non-aqueous solvent having a relative permittivity ($\epsilon$, 25° C.) of 25 or more, and from the viewpoint of achieving the safety, the solvent is preferably a non-aqueous solvent having a flash point of 70° C. or higher.

From the viewpoint of obtaining an electrolytic solution having more excellent heat stability, the solvent preferably contains a solvent having a boiling point of 250° C. or higher, a melting point of −60 to 40° C. and a permittivity ($\epsilon$, 25° C.) of 25 or more in an amount of 25% by weight or more, based on the total weight of the solvents. Especially preferred is a solvent containing such a solvent in an amount of 40% by weight or more, particularly 50% by weight or more. Examples of such solvents include sulfones, and especially preferred are sulfolane and 3-methylsulfolane. By using the above solvents in combination in the electrolytic solution, there can be obtained an electrolytic capacitor having low impedance and high withstand voltage which ensures that it can operate at an environment temperature of 110 to 150° C. for 1,000 hours or longer.

From the viewpoint of obtaining an electrolytic capacitor having lower impedance, the solvent preferably contains a solvent having a boiling point of 190 to less than 250° C., a melting point of −60 to 40° C., and a permittivity ($\epsilon$, 25° C.) of 25 or more in an amount of 25% by weight or more, based on the total weight of the solvents. Especially preferred is a solvent containing such a solvent in an amount of 40% by weight or more, particularly 50% by weight or more. Examples of such solvents include carbonic esters, carboxylic esters, phosphoric esters, nitrites, amides and alcohols, and especially preferred are γ-butyrolactone and ethylene glycol. By using the above solvents in combination in the electrolytic solution, an electrolytic capacitor having extremely low impedance and high voltage can be obtained.

Especially preferred examples of electrolytic solutions from the viewpoint of achieving excellent heat stability, there can be mentioned electrolytic solutions for electrolytic capacitor, wherein sulfolane is a solvent and 1-ethyl-2,3-dimethylimidazolinium tetrafluoroaluminate or 1,2,3,4-tetramethylimidazolinium tetrafluoroaluminate in an amount of 5 to 40% by weight based on the weight of the electrolytic solution is added thereto. From the viewpoint of obtaining an electrolytic capacitor having low impedance, there can be mentioned electrolytic solutions for electrolytic capacitor, wherein γ-butyrolactone is a solvent, and 1-ethyl-2,3-dimethylimidazolinium tetrafluoroaluminate or 1,2,3,4-tetramethylimidazolinium tetrafluoroaluminate in an amount of 5 to 40% by weight based on the weight of the electrolytic solution is added thereto. A solvent using both sulfolane and γ-butyrolactone is also preferred.

The electrolytic solution of the present invention may contain different additives in addition to the above-mentioned salt and solvent. Various objects of adding an additive to the electrolytic solution include the improvement of electric conductivity, the improvement of heat stability, the prevention of degradation of the electrode due to hydration or dissolution, the prevention of generation of gas, the improvement of withstand voltage and the improvement of wettability. With respect to the additive content, there is no particular limitation, but it is preferably in the range of from 0.1 to 20% by weight, more preferably in the range of from 0.5 to 10% by weight.

Examples of such additives include nitro compounds such as p-nitrophenol, m-nitroacetophenone and p-nitrobenzoic acid; phosphorus compounds such as dibutyl phosphate, monobutyl phosphate, dioctyl phosphate, monooctyl octylphosphonate and phosphoric acid; boron compounds such as complex compounds of boric acid and polyhydric alcohol (e.g., ethylene glycol, glycerol, mannitol or polyvinyl alcohol); metal oxide particles such as silica and aluminosilicate; and surfactants such as polyalkylene glycol, e.g., polyethylene glycol and polypropylene glycol, and copolymers thereof, and silicone oil.

The electrolytic solution of the present invention may be used in the form of what is called gelled electrolytic solution formed by adding a polymer compound to solidify the electrolytic solution. Examples of polymers used in the gelled electrolytic solution include polyethylene oxide, polyacrylonitrile, polytetrafluoroethylene, polyvinylidene fluoride and polymethyl methacrylate.

In the electrolytic solution of the present invention, when a non-aqueous solvent is used as a solvent for the electrolytic solution, by controlling the moisture content of the electrolytic solution, the capacitor using such an electrolytic solution has more stable life properties. Generally, it is known that, when a large amount of moisture is contained in the electrolytic solution of the electrolytic capacitor using a non-aqueous solvent, aluminum used in the anode or cathode suffers degradation due to hydration and generates gas simultaneously during the use of the capacitor for a long term. Further, it is also known that, when no moisture is contained in the electrolytic solution, the anodization properties in restoring the anodic oxide film tend to be poor.

However, conventional electrolytic solutions and capacitors are used in a voltage region at a rated voltage as low as 35 V or less, and hence the effect on the life properties of the capacitor is small even when about 30% by weight of moisture is present. On the other hand, the capacitor using the electrolytic solution of the present invention can be used in a voltage region at a rated voltage as high as 100 V and meets a requirement of high heat resistance, and hence the effect of the moisture content on the properties of the capacitor is large differing from that in the conventional electrolytic solutions and capacitors. In the electrolytic solution of the present invention, when using a non-aqueous solvent, the water concentration of the electrolytic solution is preferably 1% by weight or less, and preferably 0.01 to 1% by weight, especially preferably 0.01 to 0.1% by weight taking the above anodization into consideration.

The present invention also provides an electrolytic capacitor using the electrolytic solution of the present invention. Examples of electrolytic capacitors include aluminum electrolytic capacitors, tantalum electrolytic capacitors and niobium electrolytic capacitors.

The basic construction of the aluminum electrolytic capacitor, anode, cathode and separator as well as the production of the aluminum electrolytic capacitor are as mentioned in the first embodiment.

A cathode foil having a titanium nitride thin film formed on the surface of an etched aluminum foil (for example, described in Japanese Prov. Patent Publication No. 186054/1997) may be used.

EXAMPLES

Hereinbelow, the present invention will be described in more detail with reference to the following Examples. The materials, amounts, ratios and procedure shown in the following Examples can be appropriately changed as long as the aim of the present invention is not sacrificed. Therefore, the following specific Examples should not be construed as limiting the scope of the present invention.

Examples 1 and 2, and Comparative Example 1

Example 1

1) Preparation of Capacitor Element

An anode foil obtained by subjecting an aluminum foil having a thickness of 120 μm and a purity of 99.9% to surface treatment by electrolytic etching, and then anodizing the treated aluminum foil at an anodization voltage of 160 V to form a dielectric material comprised of aluminum oxide on the surface of the foil and cutting the resultant foil into a piece of 190 mm×13.5 mm size was used.

A cathode foil obtained by subjecting an aluminum foil having a thickness of 30 μm and a purity of 99.9% to surface treatment by electrolytic etching and cutting the resultant foil into a piece of 200 mm×13.5 mm size was used.

A separator obtained by cutting manila paper having a thickness of 52 μm into a piece of 218 mm×150 mm size was used.

As shown in FIG. 1, between anode foil 1 and cathode foil 2 to which a tab terminal having lead wires 4 (solder-plated lead wires) soldered thereto was fitted by a caulking method, separator 3 was disposed. They were together spirally wound and fixed with an adhesive tape for binding the wound capacitor element. This capacitor element has specifications such that the rated voltage is 100 V and the rated electrostatic capacity is 55 μF.

2) Preparation of Electrolytic Solution

25 Parts by weight of dried 1-ethyl-2,3-dimethylimidazolinium tetrafluoroaluminate was dissolved in 75 parts by weight of γ-butyrolactone of low moisture-content grade to obtain an electrolytic solution. Then, the electrolytic solution was dehydrated by adding molecular sieves.

The dehydrated electrolytic solution had a moisture content of 10 ppm as measured by means of a Karl Fischer moisture content meter.

3) Production of Aluminum Electrolytic Capacitor

The capacitor element was placed in a closed container made of glass to which a vacuum line was connected, and the pressure in the container was reduced to about 100 Pa, and then dried at 125° C. for 1 hour, and the closed glass container containing the capacitor element was left to cool.

Figure 2:
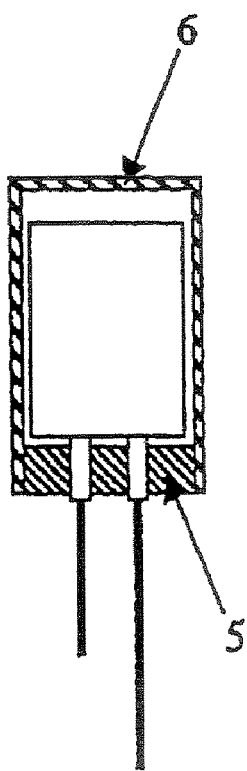
FIG. 2 is a cross-sectional view of an electrolytic capacitor, wherein reference numeral 5 designates a sealing material, and reference numeral 6 designates an outer casing.

The capacitor element was subjected to vacuum impregnation with the electrolytic solution in an argon glove box at a dew point of −80° C., and the resultant element was inserted into a 10 mmΦ×20 mmL outer casing (cylindrical casing with a bottom comprised of aluminum) 6 shown in FIG. 2, and then sealing rubber 5 comprised of a butyl rubber vulcanized with a peroxide was fitted to the casing and caulked, and then again anodized at a voltage of 100 V at 125° C. for 1 hour to produce an aluminum electrolytic capacitor.

4) Evaluation of Aluminum Electrolytic Capacitor

With respect to the obtained aluminum electrolytic capacitor, the following measurements were made. Unless otherwise specified, the measurements for evaluation were conducted in accordance with the following procedure.

Water Concentration of Electrolytic Solution in Aluminum Electrolytic Capacitor:

The aluminum electrolytic capacitor was placed in an argon glove box at a dew point of −80° C., and the capacitor was disassembled in that box to take the electrolytic solution out of the capacitor element. A water concentration of the electrolytic solution was measured by means of a Karl Fischer moisture content meter.

Heat Treatment and XPS Analysis of Cathode:

The aluminum electrolytic capacitor was allowed to stand in a thermostatic chamber at 125° C. for 50 hours. After cooling naturally, the capacitor was disassembled to take the cathode foil out, and the cathode foil washed with distilled water and acetone and dried, and then subjected to sputtering of Ar ions at 2 kV for 2 minutes, followed by XPS analysis of the surface.

As an X-ray photoelectron spectrometer, ESCA 5700Ci, manufactured by PHI was used, as a source of X-ray, Al—Kα was used, and the measurement region had a diameter of 800

Electric Conductivity:

With respect to the electrolytic solution used in the capacitor assembling, an electric conductivity at 25° C. was measured.

Others:

A leakage current (value measured after 2 minutes) was measured when a low voltage of 100 V was applied at room temperature. A no-load test was conducted at a temperature of 125° C. for 100 hours, and before and after the test, an electrostatic capacity at 120 Hz and an equivalent series resistance (ESR) at 100 kHz were measured, and the appearance of the capacitor was observed in respect of, e.g., the occurrence of blistering or leakage of liquid. The results are shown in Table-1.

Example 2

An aluminum electrolytic capacitor was produced in accordance with the same procedure as in Example 1 except that the capacitor element was dried under atmospheric pressure and that the cooling of the capacitor element and the production of the aluminum electrolytic capacitor were carried out in air at a relative humidity of 40%, and the evaluations were conducted. The results are shown in Table-1.

Comparative Example 1

An aluminum electrolytic capacitor was produced in accordance with the same procedure as in Example 1 except that the capacitor element was not dried and that the production of the capacitor was carried out in air at a relative humidity of 70%, and the evaluations were conducted. The results are shown in Table 1. The increase of ESR after the no-load test was large as compared to those in the Examples, and the occurrence of blistering due to generation of gas in the capacitor was recognized at the portion of sealing rubber.

TABLE 1

|  |  | Example 1 | Example 2 | Comparative Example 1 |
|---|---|---|---|---|
| Moisture content of electrolytic solution in capacitor (% by weight) | | 0.01 | 0.6 | 3 |
| XPS of Al2p on cathode surface (eV) | | 74.9 | 74.9 | 76.0 |
| Electric conductivity of electrolytic solution (mS/cm) | | 24.0 | 24.0 | 24.0 |
| Leakage current (μA) | | 0.8 | 1.0 | 2.2 |
| Electrostatic capacity (μF) | Before no-load test | 54.8 | 54.9 | 54.5 |
| | After no-load test | 53.5 | 53.4 | 52.2 |
| Equivalent series resistance (Ω) | Before no-load test | 0.062 | 0.063 | 0.061 |
| | After no-load test | 0.063 | 0.065 | 0.112 |
| Change of appearance after no-load test | | Not changed | Not changed | Blistering observed at sealing portion |

As is apparent from the above, the aluminum electrolytic capacitor of the present invention can be used stably for a long term while maintaining excellent impedance characteristics and excellent thermal stability as well as excellent withstand voltage properties.

Examples 3 to 5 and Comparative Example 2

Example 3

1) Preparation of Capacitor Element

An anode foil obtained by subjecting an aluminum foil having a thickness of 120 μm and a purity of 99.9% to surface treatment by electrolytic etching and then anodizing the treated aluminum foil at an anodization voltage of 160 V in an aqueous solution of ammonium adipate to form a dielectric material comprised of aluminum oxide on the surface of the foil and cutting the resultant foil into a piece of 190 mm×13.5 mm size was used.

A cathode foil obtained by subjecting an aluminum foil having a thickness of 30 μm and a purity of 99.9% to surface treatment by electrolytic etching and cutting the resultant foil into a piece of 200 mm×13.5 mm size was used.

A separator obtained by cutting manila paper having a thickness of 52 μm into a piece of 218 mm×150 mm size was used.

2) Preparation of Electrolytic Solution

As an electrolytic solution, a solution obtained by dissolving 25 parts by weight of dried 1-ethyl-2,3-dimethylimidazolinium tetrafluoroaluminate in 75 parts by weight of γ-butyrolactone of low moisture-content grade was used. This electrolytic solution had a moisture content of 1,000 ppm as measured by means of a Karl Fischer moisture content meter.

3) Production of Aluminum Electrolytic Capacitor

As shown in FIG. 1, between anode foil 1 and cathode foil 2 to which a tab terminal having lead wires 4 (solder-plated lead wires) soldered thereto was fitted, separator 3 impregnated with the electrolytic solution was disposed. They were together spirally wound and fixed with an adhesive tape for binding the wound capacitor element. This capacitor element has specifications such that the rated voltage is 100 V and the rated electrostatic capacity is 55 μF. The capacitor element was contained in a casing and sealed to produce an aluminum electrolytic capacitor (wherein the capacitor element was dried under atmospheric pressure at 125° C. for 1 hour, and the capacitor was assembled in an atmosphere at a humidity of 70%).

4) Evaluation of Aluminum Electrolytic Capacitor

Figure 3:
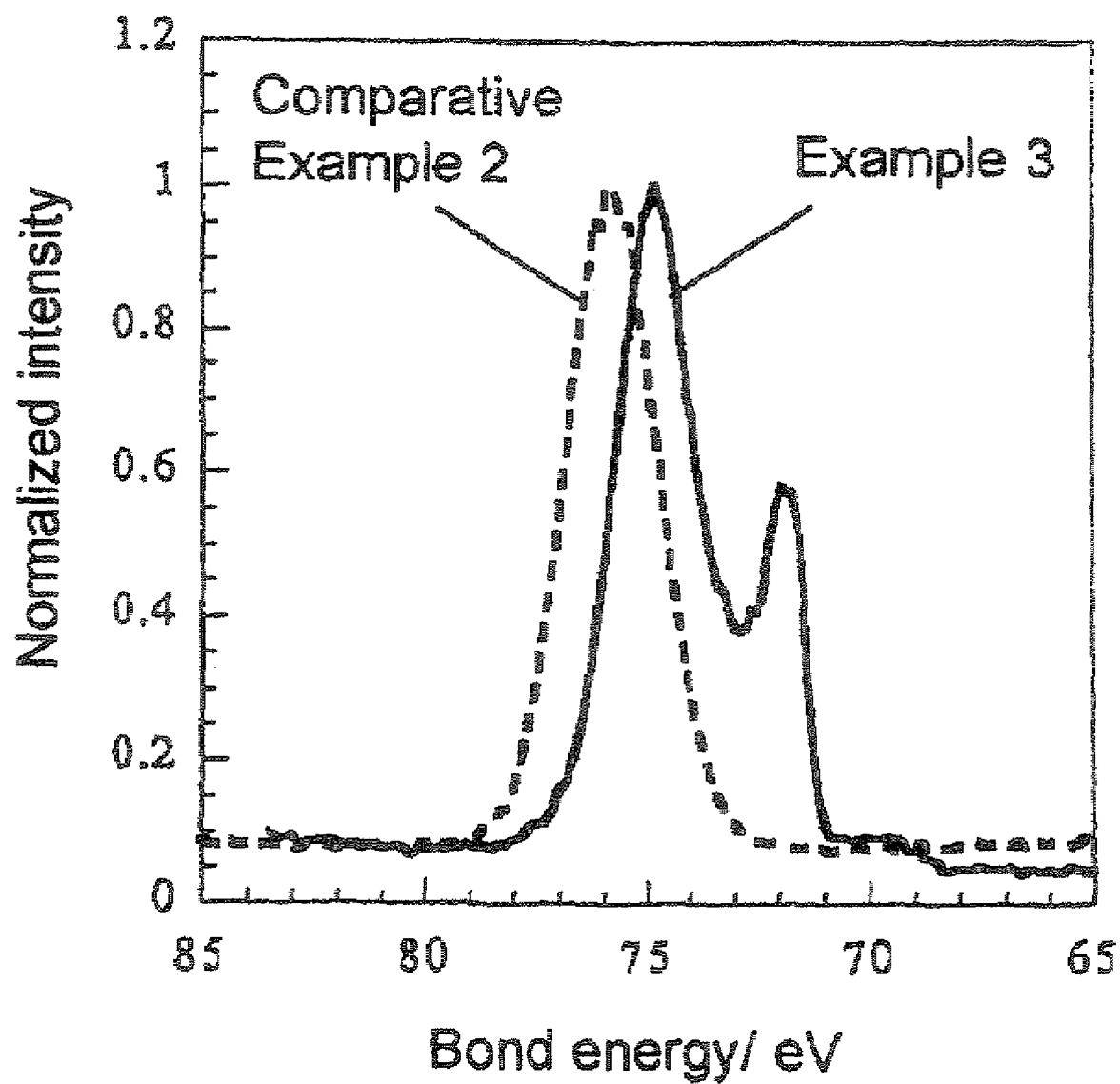
FIG. 3 shows Al2p spectra of the cathodes in Example 3 and Comparative Example 2.

With respect to the capacitor obtained, the evaluations were conducted in the same manner as in Example 1. The results are shown in Table 2 and FIG. 3. As can be seen from FIG. 3, the peak top of Al2p was 74.9 eV.

Comparative Example 2

An aluminum electrolytic capacitor was produced in accordance with the same procedure as in Example 3 except that an electrolytic solution having a moisture content of 3% by weight obtained by adding water to the electrolytic solution used in Example 3 was used and that the capacitor element was not dried (wherein the capacitor was assembled in in an atmosphere at a humidity of 70%). With respect to the capacitor obtained, the evaluations were conducted in the same manner as in Example 1. The results are shown in Table 2 and FIG. 3. As can be seen from FIG. 3, the peak top of Al2p was 76.0 eV.

TABLE 2

|  |  | Example 3 | Comparative Example 2 |
|---|---|---|---|
| Moisture content of electrolytic solution in capacitor (% by weight) | | 0.8 | 3.5 |
| XPS of Al2p on cathode surface (eV) | | 74.9 | 76.0 |
| Electric conductivity (mS/cm) | | 24.0 | 25.9 |
| Leakage current (µA) | | 1.2 | 2.5 |
| Electrostatic capacity (µF) | Before no-load test | 54.9 | 55.0 |
|  | After no-load test | 53.4 | 52.3 |
| Equivalent series resistance (Ω) | Before no-load test | 0.063 | 0.062 |
|  | After no-load test | 0.064 | 0.121 |
| Change of appearance after no-load test | | Not changed | Blistering observed at sealing portion |

Example 4

An aluminum electrolytic capacitor was produced in accordance with the same procedure as in Example 3 except that an electrolytic solution obtained by adding 1 part by weight of p-nitrobenzoic acid to the electrolytic solution used in Comparative Example 2 was used. With respect to the aluminum electrolytic capacitor obtained, the heat treatment and XPS analysis of the cathode were conducted in the same manner as in Example 1. As a result, the peak top of Al2p was found to be 74.9 eV.

Example 5

An aluminum electrolytic capacitor was produced in accordance with the same procedure as in Example 3 except that the electrolytic solution used in Comparative Example 2 was used as an electrolytic solution and that an aluminum foil anodized at an anodization voltage of 5 V in an aqueous solution of ammonium adipate was used as a cathode foil.

With respect to the aluminum electrolytic capacitor obtained, the heat treatment and XPS analysis of the cathode were conducted in the same manner as in Example 1. As a result, the peak top of Al2p was found to be 74.9 eV.

As is apparent from the above, by the present invention, there can be provided an aluminum electrolytic capacitor which can be used stably for a long term while maintaining excellent impedance characteristics and excellent thermal stability as well as excellent withstand voltage properties.

Example 6 and Comparative Examples 3 to 5

Example 6

1) Synthesis of 1-ethyl-2,3-dimethylimidazolinium tetrafluoroaluminate 11.2 g (0.10 mol) of 1-ethyl-2-methylimidazoline, 18.0 g (0.20 mol) of dimethyl carbonate and 27.2 g of methanol were charged into a 100 ml autoclave to effect a reaction in a nitrogen gas atmosphere at 145° C. for 8 hours, obtaining 1-ethyl-2,3-dimethylimidazolinium methylcarbonate in 100% yield. Subsequently, the resultant reaction mixture was transferred to a flask made of Teflon® having a reflux condenser, and 3.70 g (0.10 mol) of ammonium fluoride was mixed into the mixture to effect a reaction at 50° C. for 5 hours, obtaining 1-ethyl-2,3-dimethylimidazolinium fluoride in 100% yield. After completion of the reaction, a white solid substance formed from ammonia and carbon dioxide was deposited onto the reflux condenser and part of the solid substance was mixed into the reaction mixture, and therefore it was removed by filtration and the resultant mixture was used in the subsequent step for reaction.

13.8 g (0.10 mol) of aluminum fluoride trihydrate was mixed into the reaction mixture to effect a reaction at 55° C. for 10 hours. After completion of the reaction, the reaction mixture was filtered to remove insolubles, and then the solvent was distilled off from the reaction mixture under a reduced pressure, followed by crystallization from 46.0 g of n-butanol, to obtain white crystal of 1-ethyl-2,3-dimethylimidazolinium tetrafluoroaluminate. The product weight was 20.2 g (0.088 mol), and the yield was 88% based on 1-ethyl-2-methylimidazoline as the starting material.

2) Preparation of Electrolytic Solution

The 1-ethyl-2,3-dimethylimidazolinium tetrafluoroaluminate obtained was dissolved in γ-butyrolactone to prepare an electrolytic solution having a concentration of 25%. The electrolytic solution had an electric conductivity of 24.0 mS/cm at 25° C. The electrolytic solution had a moisture content of 400 ppm. The electrolytic solution was analyzed by liquid chromatography in respect of the impurities contained. As a result, it was found that the content of the sum of N-(2-ethylaminoethyl)acetamide, N-(2-aminoethyl)-N-ethylacetamide, N-(2-ethylaminoethyl)-N-methylacetamide, N-ethyl-N-(2-methylaminoethyl)acetamide, 1-ethyl-2-methylimidazoline and 1-ethyl-2-methoxycarbonylmethyl-3-methylimidazolinium in the electrolytic solution was 0.01% by weight or less which corresponds to the limit of detection of the liquid chromatography.

3) Production of Aluminum Electrolytic Capacitor

Using the 25% γ-butyrolactone solution of 1-ethyl-2,3-dimethylimidazolinium tetrafluoroaluminate, a CE04 type aluminum electrolytic capacitor having a rated voltage of 100 V and a casing size of 10 Φ×20 L was produced. A capacitor element which was prepared by spirally winding together an anode obtained by anodizing an etched aluminum foil to form a dielectric film comprised of aluminum oxide on the surface of the foil, a cathode obtained by etching an aluminum foil and a separator comprised of manila paper, was used. The capacitor element was dried at 125° C., and then subjected to vacuum impregnation with the electrolytic solution, and the resultant element was caulked together with a cylindrical aluminum casing and a sealing material comprised of a butyl rubber. Finally, the capacitor was subjected to aging under temperature and pressure conditions higher than the use conditions to restore the anodic oxide film, producing an aluminum electrolytic capacitor. A direct voltage of 100 V was applied to the capacitor at 25° C., and a leakage current was measured after 2 minutes. The leakage current was 1.2 µA.

Comparative Example 3

An electrolytic solution was prepared in the same manner as in Example 1 except that the 1-ethyl-2,3-dimethylimidazolinium tetrafluoroaluminate in Example 6 was dried without recrystallization and used. The electrolytic solution had an electric conductivity of 22.8 mS/cm at 25° C. The electrolytic solution had a moisture content of 550 ppm. The electrolytic solution was analyzed by liquid chromatography in respect of the impurities contained. As a result, it was found that the content of the sum of N-(2-ethylaminoethyl) acetamide, N-(2-aminoethyl)-N-ethylacetamide, N-(2-ethylaminoethyl)-N-methylacetamide, N-ethyl-N-(2-methylaminoethyl)acetamide, 1-ethyl-2-methylimidazoline and 1-ethyl-2-methoxycarbonylmethyl-3-methylimidazolinium in the electrolytic solution was 0.8% by weight. Using this electrolytic solution, an aluminum electrolytic capacitor was produced in the same manner as in Example 6, and a leakage current was measured. The leakage current was 2.5 µA.

Comparative Example 4

For examining the effect of specific impurities on the leakage current of the electrolytic capacitor, 0.8% by weight of N-(2-ethylaminoethyl)-N-methylacetamide and 0.2% by weight of N-ethyl-N-(2-methylaminoethyl)acetamide were added to the electrolytic solution prepared in Example 6. The resultant electrolytic solution had an electric conductivity of 23.8 mS/cm at 25° C. The electrolytic solution had a moisture content of 0.1% by weight. Using this electrolytic solution, an aluminum electrolytic capacitor was produced in the same manner as in Example 6, and a leakage current was measured. The leakage current was 1.6 µA.

Comparative Example 5

For examining the effect of a specific impurity on the leakage current of the electrolytic capacitor, 0.8% by weight of 1-ethyl-2-methylimidazoline was added to the electrolytic solution prepared in Example 6. The resultant electrolytic solution had an electric conductivity of 24.0 mS/cm at 25° C. The electrolytic solution had a moisture content of 0.1% by weight. Using this electrolytic solution, an aluminum electrolytic capacitor was produced in the same manner as in Example 6, and a leakage current was measured. The leakage current was 1.7 µA.

TABLE 3

|  | Example 6 | Comparative Example 3 | Comparative Example 4 | Comparative Example 5 |
|---|---|---|---|---|
| Content of impurities represented by formulae (2) to (4) (% by weight) | 0.01 or less* | 0.8 | 1.0 added | 0.8 added |
| Electric conductivity (mS/cm) | 24.0 | 22.8 | 23.8 | 24.0 |
| Leakage current (µA) | 1.2 | 2.5 | 1.6 | 1.7 |

Note)
*designates 0.01% by weight or less, which corresponds to the limit of detection of the liquid chromatography.

As is apparent from the above, by using the electrolytic solution for electrolytic capacitor of the present invention, there can be provided an electrolytic capacitor which is advantageous not only in that it has high electric conductivity and excellent thermal stability as well as excellent withstand voltage properties, but also in that the leakage current is small.

Examples 7 to 12, and Comparative Examples 6 and 7

Example 7

1) Synthesis of Tetrafluoroaluminate 17.06 g (0.400 mol) of hydrofluoric acid (46.9 wt % aqueous solution) was charged into a round bottom flask made of PFA, and a suspension which was obtained by suspending 8.19 g (0.100 mol) of aluminum hydroxide (purity: 95.2% by weight) in 23.40 g of water was added dropwise to the flask over 15 minutes while cooling the reaction vessel in an ice bath. The resultant mixture was stirred at room temperature for another 30 minutes, and then 58.99 g (0.105 mol) of a methanol-dimethyl carbonate solution of 1-ethyl-2,3-dimethylimidazolinium methylcarbonate (1.78 mol/kg) was added dropwise to the mixture and stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 22.0 g, and the yield was 96% based on the starting material.

2) Preparation of Electrolytic Solution

The 1-ethyl-2,3-dimethylimidazolinium tetrafluoroaluminate obtained was dissolved in γ-butyrolactone to prepare an electrolytic solution having a concentration of 25%. The electrolytic solution had an electric conductivity of 24.3 mS/cm at 25° C. Similarly the tetrafluoroaluminate was dissolved in γ-butyrolactone to prepare an electrolytic solution having a concentration of 40%. The electrolytic solution had an electric conductivity of 29.0 mS/cm at 25° C. The electrolytic solution had a moisture content of 1,600 ppm.

3) Production of Aluminum Electrolytic Capacitor

Using the 40% γ-butyrolactone solution of 1-ethyl-2,3-dimethylimidazolinium tetrafluoroaluminate, a CE04 type aluminum electrolytic capacitor having a rated voltage of 100 V and a casing size of 10 Φ×20 L was produced. A capacitor element which was prepared by spirally winding together an anode obtained by anodizing an etched aluminum foil to form a dielectric film comprised of aluminum oxide on the surface of the foil, a cathode obtained by etching an aluminum foil and a separator comprised of manila paper, was used. The capacitor element was dried at 125° C., and then subjected to vacuum impregnation with the electrolytic solution, and the resultant element was caulked together with a cylindrical aluminum casing and a sealing material comprised of a butyl rubber. Finally, the capacitor was subjected to aging under temperature and pressure conditions higher than the use conditions to restore the anodic oxide film, producing an aluminum electrolytic capacitor.

This capacitor had an electrostatic capacity of 55° F. at 120 Hz and an ESR (equivalent series resistance) of 0.04Ω at 100 kHz.

Example 8

12.79 g (0.300 mol) of hydrofluoric acid (46.9 wt % aqueous solution) was charged into a round bottom flask made of PFA, and a suspension which was obtained by suspending 8.60 g (0.105 mol) of aluminum hydroxide (purity: 95.2% by weight) in 24.60 g of water was added dropwise to the flask over 15 minutes while cooling the reaction vessel in an ice bath. The resultant mixture was stirred at room temperature for another 30 minutes, and then 23.80 g (0.100 mol) of a methanol solution of 1-ethyl-2,3-dimethylimidazolinium fluoride (4.19 mol/kg) was added dropwise to the mixture and stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 16.8 g, and the yield was 73% based on the starting material.

Example 9

17.06 g (0.400 mol) of hydrofluoric acid (46.9 wt % aqueous solution) was charged into a round bottom flask made of PFA, and while cooling the reaction vessel in an ice bath, 56.20 g (0.100 mol) of a methanol-dimethyl carbonate solution of 1-ethyl-2,3-dimethylimidazolinium methylcarbonate (1.78 mol/kg) was added dropwise to the flask over 15 minutes and then a suspension which was obtained by suspending 8.19 g (0.100 mol) of aluminum hydroxide (purity: 95.2% by weight) in 23.40 g of water, was added dropwise to the flask over 15 minutes. The resultant mixture was stirred at room temperature for 30 minutes, and then stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 21.5 g, and the yield was 93% based on the starting material.

Example 10

29.60 g (0.05 mol) of fluorosilicic acid (24.3% by weight aqueous solution) was charged into a round bottom flask made of PFA, and a suspension which was obtained by suspending 8.19 g (0.100 mol) of aluminum hydroxide (purity: 95.2% by weight) in 23.40 g of water was added dropwise to the flask over 15 minutes at room temperature. The resultant reaction mixture was stirred at 95° C. for 10 minutes, and then 23.80 g (0.100 mol) of a methanol solution of 1-ethyl-2,3-dimethylimidazolinium fluoride (4.19 mol/kg) was added dropwise to the mixture at room temperature, and stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 18.2 g, and the yield was 79% based on the starting material.

Example 11

5.10 g (0.05 mol) of aluminum oxide ($Al_2O_3$) was charged into a round bottom flask made of PFA, and 17.06 g (0.400 mol) of hydrofluoric acid (46.9 wt % aqueous solution) was added dropwise to the flask over 20 minutes at room temperature. The resultant mixture was stirred at 90° C. for 60 minutes, and then 58.99 g (0.105 mol) of a methanol-dimethyl carbonate solution of 1-ethyl-2,3-dimethylimidazolinium methylcarbonate (1.78 mol/kg) was added dropwise to the mixture while cooling the reaction vessel in an ice bath, and stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 20.0 g, and the yield was 87% based on the starting material.

Example 12

8.53 g (0.200 mol) of hydrofluoric acid (46.9 wt % aqueous solution) and 11.70 g of water were charged into a round bottom flask made of PFA, and 1.35 g (0.05 mol) of metallic aluminum in the form of divided pieces was added portion by potion to the flask over 15 minutes while cooling the reaction vessel in an ice bath. The resultant mixture was stirred at room temperature for another 2 hours, and then 29.49 g (0.0525 mol) of a methanol-dimethyl carbonate solution of 1-ethyl-2,3-dimethylimidazolinium methylcarbonate (1.78 mol/kg) was added dropwise to the mixture, and stirred at 60° C. for 1 hour. The resultant reaction mixture was filtered to remove solids, and then the solvent was distilled off followed by crystallization from n-butanol to obtain white crystal of 1-ethyl-2,3-dimethylimidazolinium tetrafluoroaluminate. The product weight was 10.4 g, and the yield was 90% based on the starting material.

Comparative Example 6

56.5 g (100 mmol) of a methanol-dimethyl carbonate solution of 1-ethyl-2,3-dimethylimidazolinium methylcarbonate (1.77 mol/kg) and 3.70 g (100 mmol) of ammonium fluoride were charged into a round bottom flask made of glass, and stirred at 50° C. for 5 hours. The resultant reaction mixture was filtered, and 13.80 (100 mmol) of aluminum trifluoride trihydrate was added to the filtrate and stirred at 50° C. for 3 hours, so that the reaction mixture was gelated.

Comparative Example 7

30 g (1.500 mmol) of hydrogen fluoride was charged into a round bottom flask made of PFA, and 28.3 g (50 mmol) of a methanol-dimethyl carbonate solution of 1-ethyl-2,3-dimethylimidazolinium methylcarbonate (1.77 mol/kg) was added dropwise to the flask. The resultant mixture was stirred for 30 minutes, and 6.90 (50 mmol) of aluminum trifluoride trihydrate was added to the mixture and stirred for 3 hours. The resultant reaction mixture first became in the form of a solution, and then a solid substance precipitated. The reaction mixture and the solid substance were analyzed, but neither contained 1-ethyl-2,3-dimethylimidazolinium tetrafluoroaluminate.

As is apparent from the above, by the present invention, an organic onium tetrafluoroaluminate useful as various chemicals including an electrolyte for use in an electrochemical device such as a battery or an electrolytic capacitor, can be synthesized in high yield.

INDUSTRIAL APPLICABILITY

By the present invention, there can be provided an aluminum electrolytic capacitor which can be used stably for a long term while maintaining excellent impedance characteristics and excellent thermal stability as well as excellent withstand voltage properties.

Further, by using the electrolytic solution for electrolytic capacitor of the present invention, there can be provided an electrolytic capacitor which is advantageous not only in that it has high electric conductivity and excellent thermal stability as well as excellent withstand voltage properties, but also in that the leakage current is small.

In addition, by the present invention, an organic onium tetrafluoroaluminate useful as various chemicals including an electrolyte for use in an electrochemical device such as a battery or an electrolytic capacitor, can be synthesized in high yield.

The invention claimed is:

1. An aluminum electrolytic capacitor comprising an anode, a cathode comprising aluminum and an electrolytic solution containing an onium salt of fluorine-containing anion, wherein the cathode has a peak top of Al2p spectrum of 74.0 to 75.8 eV as measured by a method in which the surface of the cathode in the aluminum electrolytic capacitor heated at 125° C. for 50 hours is analyzed by X-ray photoelectron spectroscopy (XPS).

2. The aluminum electrolytic capacitor according to claim 1, wherein the electrolytic solution has a water concentration of 1% by weight or less.

3. The aluminum electrolytic capacitor of claim 2, wherein the fluorine-containing anion is an anion represented by the following formula (a):

wherein:
M represents an element selected from the group consisting of B, Al, P, Nb, Sb and Ta; and
n represents a number of 4 or 6.

4. The aluminum electrolytic capacitor of claim 3, wherein the onium salt is at least one member selected from the group consisting of a quaternary ammonium salt, a quaternary phosphonium salt, a quaternary imidazolium salt, a quaternary amidinium salt and an ammonium salt.

5. The aluminum electrolytic capacitor of claim 4, wherein the aluminum electrolytic capacitor is assembled in an atmosphere having a moisture content of 50% or less in terms of a relative humidity.

6. The aluminum electrolytic capacitor of claim 3, wherein the aluminum electrolytic capacitor is assembled in an atmosphere having a moisture content of 50% or less in terms of a relative humidity.

7. The aluminum electrolytic capacitor of claim 2, wherein the onium salt is at least one member selected from the group consisting of a quaternary ammonium salt, a quaternary phosphonium salt, a quaternary imidazolium salt, a quaternary amidinium salt and an ammonium salt.

8. The aluminum electrolytic capacitor of claim 7, wherein the aluminum electrolytic capacitor is assembled in an atmosphere having a moisture content of 50% or less in terms of a relative humidity.

9. The aluminum electrolytic capacitor of claim 2, wherein the aluminum electrolytic capacitor is assembled in an atmosphere having a moisture content of 50% or less in terms of a relative humidity.

10. The aluminum electrolytic capacitor of claim 1, wherein the fluorine-containing anion is an anion represented by the following formula (a):

wherein:
M represents an element selected from the group consisting of B, Al, P, Nb, Sb and Ta; and
n represents a number of 4 or 6.

11. The aluminum electrolytic capacitor of claim 10, wherein the onium salt is at least one member selected from the group consisting of a quaternary ammonium salt, a quaternary phosphonium salt, a quaternary imidazolium salt, a quaternary amidinium salt and an ammonium salt.

12. The aluminum electrolytic capacitor of claim 11, wherein the aluminum electrolytic capacitor is assembled in an atmosphere having a moisture content of 50% or less in terms of a relative humidity.

13. The aluminum electrolytic capacitor of claim 10, wherein the aluminum electrolytic capacitor is assembled in an atmosphere having a moisture content of 50% or less in terms of a relative humidity.

14. The aluminum electrolytic capacitor of claim 1, wherein the onium salt is at least one member selected from the group consisting of a quaternary ammonium salt, a quaternary phosphonium salt, a quaternary imidazolium salt, a quaternary amidinium salt and an ammonium salt.

15. The aluminum electrolytic capacitor of claim 14, wherein the aluminum electrolytic capacitor is assembled in an atmosphere having a moisture content of 50% or less in terms of a relative humidity.

16. The aluminum electrolytic capacitor of claim 1, wherein the aluminum electrolytic capacitor is assembled in an atmosphere having a moisture content of 50% or less in terms of a relative humidity.

* * * * *